(12) United States Patent
Seki et al.

(10) Patent No.: US 8,777,458 B2
(45) Date of Patent: Jul. 15, 2014

(54) LIGHT FLUX CONTROLLING MEMBER, LIGHT EMITTING DEVICE, AND LIGHTING DEVICE

(75) Inventors: Akinobu Seki, Saitama (JP); Kyouhei Yamada, Saitama (JP); Noriyuki Kawahara, Saitama (JP); Hiroshi Takatori, Saitama (JP)

(73) Assignee: Enplas Corporation, Saitama (JP)

( * ) Notice: Subject to any disclaimer, the term of this patent is extended or adjusted under 35 U.S.C. 154(b) by 506 days.

(21) Appl. No.: 13/075,359

(22) Filed: Mar. 30, 2011

(65) Prior Publication Data

US 2011/0255291 A1  Oct. 20, 2011

(30) Foreign Application Priority Data

Mar. 30, 2010 (JP) ................................. 2010-076845
Jun. 25, 2010 (JP) ................................. 2010-145485

(51) Int. Cl.
*F21V 5/00* (2006.01)
*F21V 3/00* (2006.01)

(52) U.S. Cl.
USPC ........... 362/332; 362/326; 362/334; 362/336; 362/311.07

(58) Field of Classification Search
USPC ........................ 362/308, 309, 311.01–311.02, 362/311.06–311.07, 326, 331–340
See application file for complete search history.

(56) References Cited

U.S. PATENT DOCUMENTS

| | | | | |
|---|---|---|---|---|
| 1,630,706 A | * | 5/1927 | Laabs | 65/38 |
| 1,981,761 A | * | 11/1934 | Townsend | 362/510 |
| 2,908,197 A | * | 10/1959 | Wells et al. | 340/815.76 |
| 4,612,608 A | * | 9/1986 | Peitz | 362/297 |
| 5,182,444 A | * | 1/1993 | Howard | 359/720 |
| 6,273,596 B1 | | 8/2001 | Parkyn, Jr. | |
| 6,773,135 B1 | | 8/2004 | Packer | |
| 6,784,357 B1 | * | 8/2004 | Wang | 136/244 |
| 7,841,750 B2 | * | 11/2010 | Wilcox et al. | 362/334 |
| 2003/0099115 A1 | * | 5/2003 | Reill | 362/555 |

(Continued)

FOREIGN PATENT DOCUMENTS

| | | |
|---|---|---|
| CN | 101622723 A | 1/2010 |
| GB | 2421584 A | 6/2006 |
| JP | 2001-307508 A | 11/2001 |
| JP | 2008-216613 A | 9/2008 |

OTHER PUBLICATIONS

Extended European Search Report for European Patent Application 11160402.1, European Patent Office, May 7, 2012.

*Primary Examiner* — Jong-Suk (James) Lee
*Assistant Examiner* — Bryon T Gyllstrom
(74) *Attorney, Agent, or Firm* — Washida & Associates

(57) ABSTRACT

Disclosed is a light emitting device to reduce the number of components and elements of a light emitting device and a lighting device having the light emitting device, and simplify and miniaturize the structures of these devices. With this light flux controlling member (4), a total reflecting surface (12) functions like a reflecting member, light from a light emitting element (LED, for example) (3) that is incident from an input surface (13) and that arrives at the total reflecting surface (12) is total-reflected by the total reflecting surface (12) toward the output surface (11) side (including a first output surface (11*a*) and second output surface (11*b*)), and the illuminating light from the second output surface (11*b*) is superimposed upon the illuminating light from the first output surface (11*a*), so that the light from the light emitting element (LED, for example) (3) is used efficiently and illuminates the illumination target surface (6) over a wide range.

8 Claims, 27 Drawing Sheets

(56) References Cited

U.S. PATENT DOCUMENTS

| | | | |
|---|---|---|---|
| 2006/0291079 A1* | 12/2006 | Beukert et al. ................ 359/850 |
| 2007/0201225 A1 | 8/2007 | Holder et al. |
| 2007/0257272 A1 | 11/2007 | Hutchins |
| 2009/0290360 A1* | 11/2009 | Wilcox et al. ................. 362/327 |
| 2010/0110693 A1* | 5/2010 | Bremerich ............... 362/296.01 |
| 2011/0018466 A1 | 1/2011 | Hutchins |
| 2011/0096561 A1* | 4/2011 | Owada .......................... 362/521 |
| 2013/0069544 A1 | 3/2013 | Hutchins |

* cited by examiner

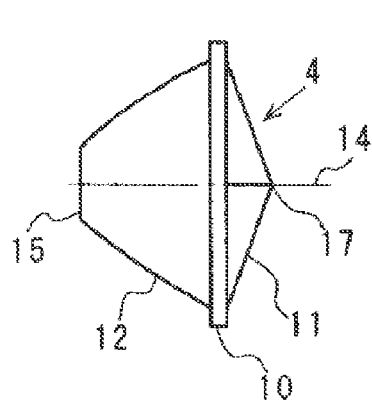
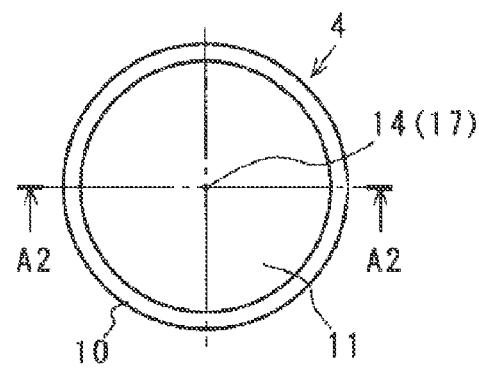
FIG.6B  FIG.6A
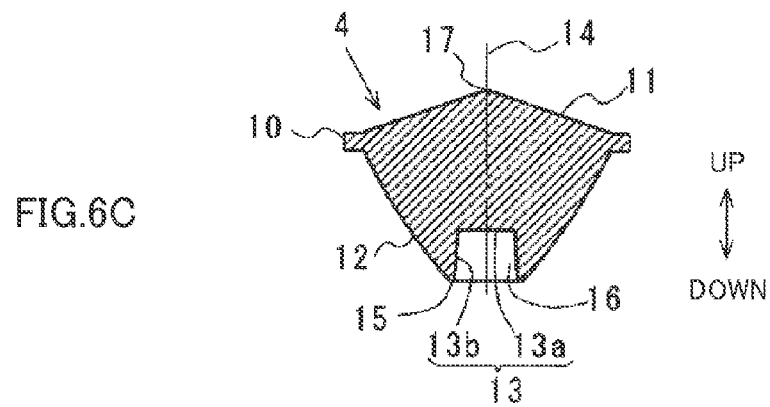
FIG.6C
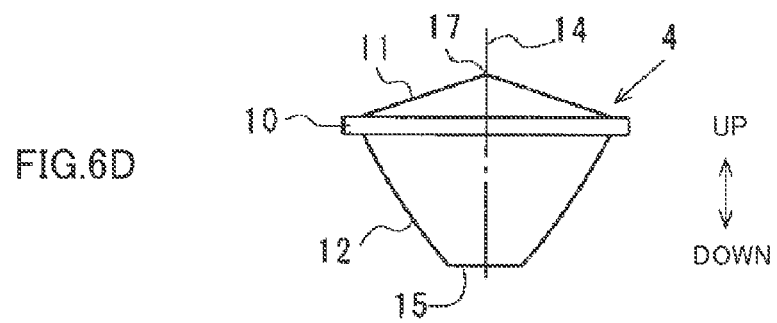
FIG.6D
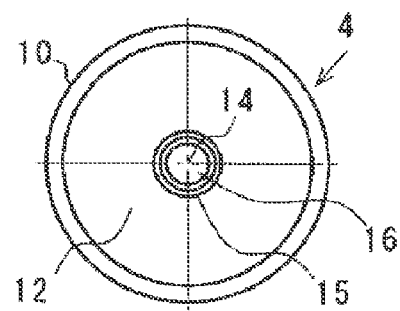
FIG.6E

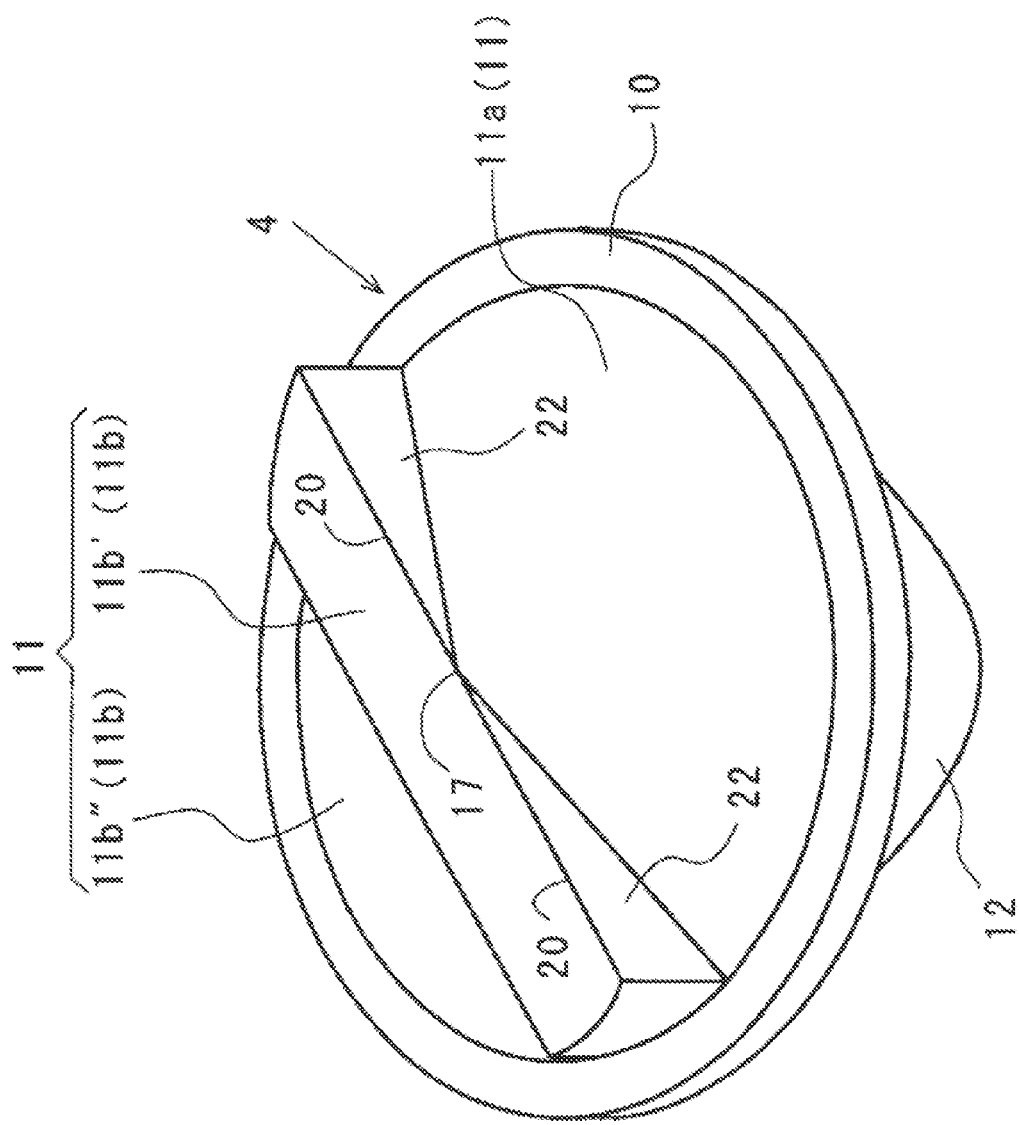

LIGHT FLUX CONTROLLING MEMBER, LIGHT EMITTING DEVICE, AND LIGHTING DEVICE

CROSS REFERENCE TO RELATED APPLICATIONS

The disclosures of Japanese Patent Applications No. 2010-076845, filed on Mar. 30, 2010, and No. 2010-145485, filed on Jun. 25, 2010, including the specifications, drawings and abstracts, are incorporated herein by reference in their entirety.

TECHNICAL FIELD

The present invention relates to a light flux controlling member (LED, for example) that controls the direction of light output from a light emitting element, a light emitting device having this light flux controlling member, and a lighting device that illuminates an illumination-target surface of a lighting-target member (advertisement panel, wall surface, ceiling surface, floor surface, etc.) by means of this light emitting device.

BACKGROUND ART

Heretofore, for example, as shown in FIG. 1, external-lighting lighting device 103 has been known that places light emitting device 101 diagonally below and in front of signboard 100, and illuminates illumination-target surface (surface) 102 of signboard 100 by the light output from this light emitting device 101. Light emitting device 101 that is used in this external-lighting lighting device 103 has light source 104 such as a halogen lamp and a discharge lamp accommodated in case 105, reflects the light from light source 104 by means of reflecting member 106 provided inside case 105, refracts and outputs the light that arrives directly from light source 104 and the light that is reflected by reflecting member 106 and then arrives, by means of lens 107, and illuminates illumination-target surface 102 by the light output from this lens 107. The same technology as the technology of this lighting device 103 is disclosed in patent literature 1 and patent literature 2.

CITATION LIST

Patent Literature

PTL 1
Japanese Patent Application Laid-Open No. 2001-307508
PTL 2
Japanese Patent Application Laid-Open No. 2008-216613

SUMMARY OF INVENTION

Technical Problem

However, with a conventional lighting device, a light emitting device has a complex structure and requires a large number of components, and so it is not possible to meet the demand to lower the product cost, including the light emitting device, or meet the demand to reduce space. Furthermore, a conventional light emitting device uses a halogen lamp or a discharge lamp as a light source, and so it is not possible to meet the demand to save power.

It is therefore an object of the present invention to provide a light flux controlling member that simplifies the structure and reduces the number of components of a light emitting device, and that reduces the cost, space and power consumption of a lighting device.

Solution to Problem

A light flux controlling member according to the present invention emits light from a light emitting element, from a location diagonally in front of an illumination target surface, diagonally with respect to the illumination target surface, a center axis of the light flux controlling member being provided to match an optical axis of the light emitting element, and this light flux controlling member has: an input surface that receives as input the light from the light emitting element; a total reflecting surface that total-reflects to collect part of the light received as input on the input surface; and an output surface that outputs the light total-reflected on the total reflecting surface and light arriving directly from the input surface, and, in this light flux controlling member, the input surface is an inner surface of a recess formed on a back surface side to face the light emitting element, and has a first input surface that is located in a bottom part of the recess and a second input surface that is located between the first input surface and an opening edge of the recess; the total reflecting surface is formed between the back surface side and the output surface side and is formed to surround the optical axis, and total-reflects light received as input mainly from the second input surface in the input surfaces, toward the output surface side; the output surface has a first output surface that is formed in a location on an opposite side of the back surface, around the optical axis, and that is provided closer to the illumination-target surface beyond the optical axis, and a second output surface that is provided in a location farther away from the illumination target surface than the first output surface; and the second output surface is formed such that, compared to light distribution characteristics of output light from a surface rotating the first output surface through 180 degrees around the optical axis of the light emitting element as a rotation axis, with output light from the second output surface, a greater number of light fluxes travel toward the illumination target surface.

Advantageous Effects of Invention

With the light flux controlling member of the present invention, a total reflecting surface functions like a reflecting member so that light from a light emitting element (LED, for example) that is incident on an incident surface and arrives at a total reflecting surface is total-reflected from the total reflecting surface toward output surfaces (first output surface and second output surface) and the illuminating light from the second output surface is superimposed upon the illuminating light from the first output surface. By this means, it is possible to use the light from a light emitting element (LED, for example) efficiently, and furthermore illuminate an illumination-target surface over a wide range. Consequently, the light flux controlling member of the present invention does not require a reflecting member. As a result of this, it is possible to simplify the structure and reduce the number of components of a light emitting device using the light flux controlling member of the present invention, and, consequently, meet the demand for reduced space and reduced product cost with respect to a lighting device. Also, a light emitting device using the light flux controlling member of the present invention and a lighting device use a light emitting element (LED, for example) as a light source, so that it is possible to save power compared to prior art using a halogen lamp or a discharge lamp as a light source.

BRIEF DESCRIPTION OF DRAWINGS

FIGS. 6A-6E shows a comparative example of a light flux controlling member;

FIG. 19 is an outer perspective view showing a fifth embodiment of a light flux controlling member (an outer view seen from diagonally above);

FIG. 26(b) shows a lighting state of an illumination-target surface of an internal-lighting lighting device according to a comparative example; FIG. 27(b) shows a first group light flux controlling member according to the present invention, and FIG. 27(c) explains difference between light flux controlling members in output characteristics found in a simulation experiment.

DESCRIPTION OF EMBODIMENTS

Now, embodiments of the present invention will be described in detail with reference to the accompanying drawings.

(Light Emitting Device and Lighting Device)

Figure 1:
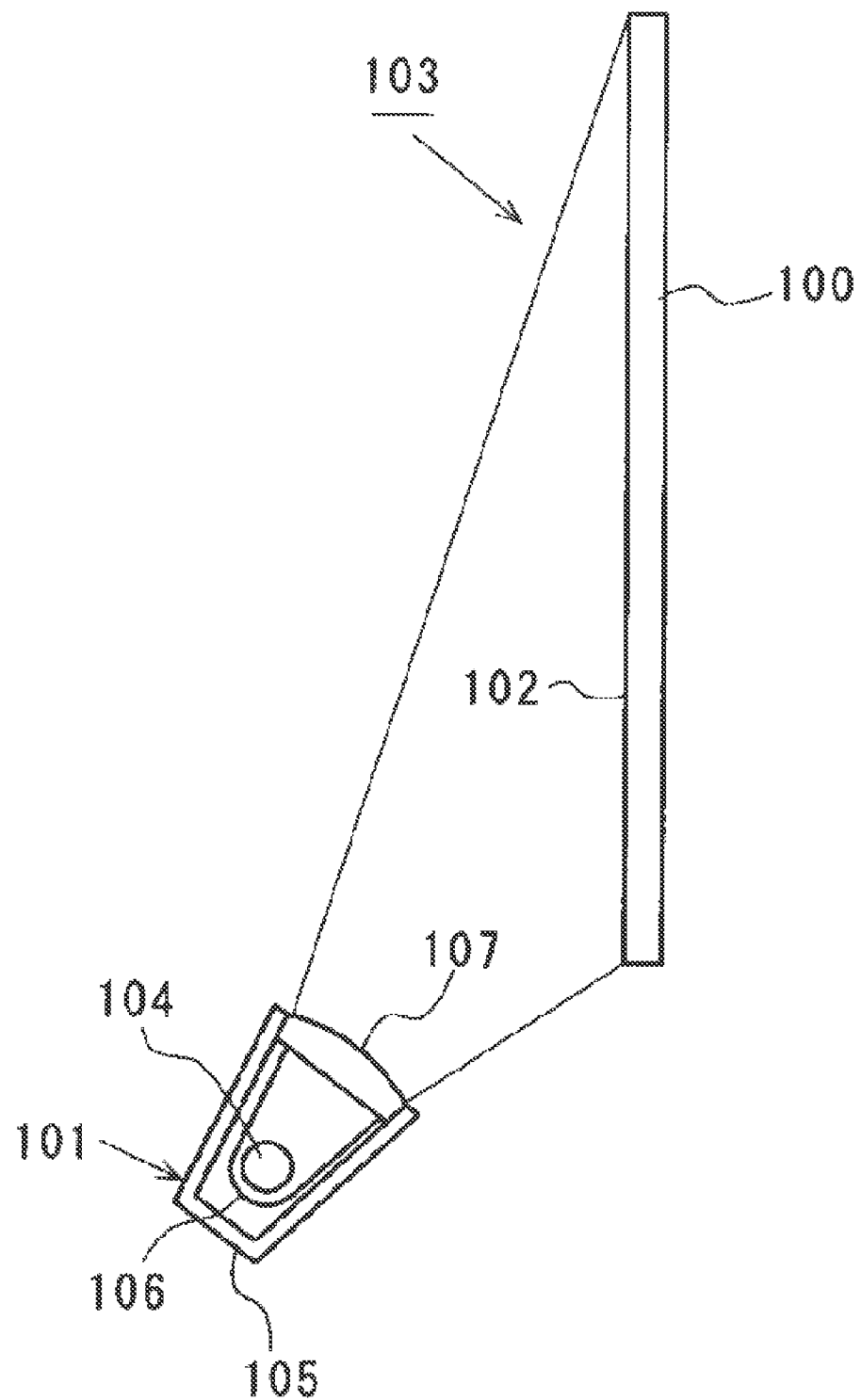
FIG. 1 shows a lighting device according to prior art.
Figure 2:
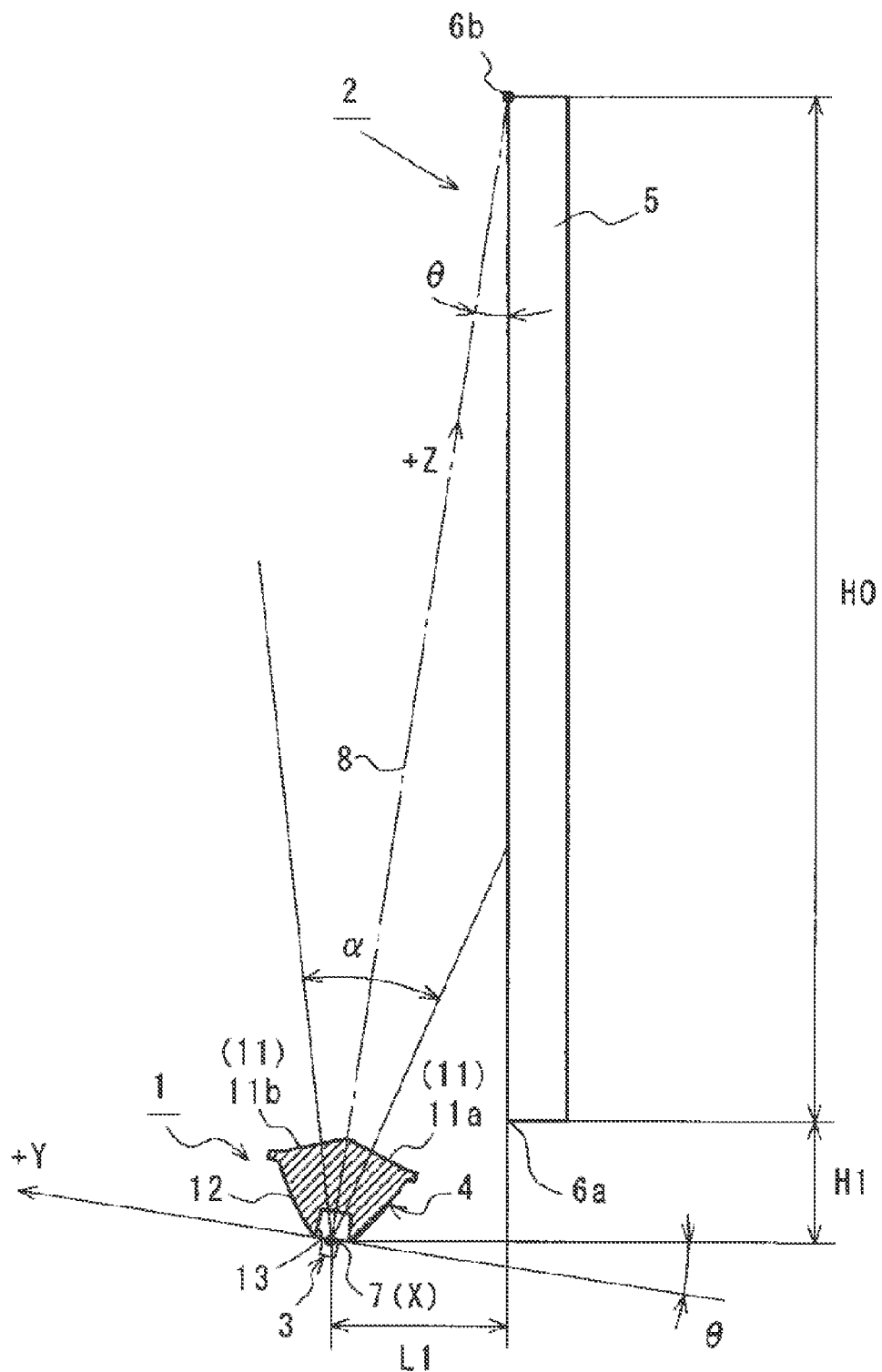
FIG. 2 shows a light emitting device according to an embodiment of the present invention and a lighting device using this light emitting device.

FIG. 2 is a side view of light emitting device 1 and lighting device 2 using this light emitting device 1, according to an embodiment.

As shown in this FIG. 2, light emitting device 1 outputs the light emitted from light emitting element 3 (for example, LED and LED sealed by a sealing member) via light flux controlling member 4. Light emitting element 3 and light flux controlling member 4 are associated on a one-by-one basis. Also, in FIG. 2, α shows the luminous intensity half power angle of the output light of light emitting element 3.

Lighting device 2 using this light emitting device 1 illuminates illumination-target surface 6 (for example, advertisement surface of an advertisement panel) of lighting-target member 5 (for example, an advertisement panel), from diagonally below in the front, by the light emitted from light emitting device 1. That is to say, light emitting element 3 is placed in a location where light emission center 7 is H1 lower from the area opposing illumination-target surface 6 straight (that is, lower edge 6a of illumination-target surface 6) and where light emission center 7 is L1 in the front from illumination-target surface 6. Also, light emitting element 3 is placed such that optical axis 8 extends toward upper edge 6b of illumination-target surface 6 and is inclined by θ with respect to illumination-target surface 6. Here, optical axis 8 refers to or indicates the traveling direction of light in the center of a three-dimensional output light flux from light emitting element 3. Then, in FIG. 2, the direction that is perpendicular to the sheet of the drawing and perpendicular to optical axis 8 is the X axis. Also, in FIG. 2, the direction that is parallel to the sheet of the drawing and perpendicular to optical axis 8 is the Y axis. Also, in FIG. 2, the direction that runs along optical axis 8 of light emitting element 3 and that is perpendicular to the X axis and Y axis at the intersection of the X axis and the Y axis, is the Z axis. Also, the intersection of the X axis, Y axis and Z axis is light emission center 7 of light emitting element 3. Also, although with lighting device 2 according to the present embodiment light emitting device 1 is placed such that optical axis 8 is oriented toward upper edge 6b of illumination-target surface 6, the present invention is by no means limited to this, and optical axis may be oriented toward a location apart from upper edge 6b of illumination-target surface 6, depending on the shape and other properties of illumination-target surface 6, insofar as optical axis 8 that extends from light emission center 7 of light emitting element 3 approaches illumination-target surface 6 closer as optical axis gets farther from light emission center 7 along the +Z axis direction.

First Embodiment of Light Flux Controlling Member

Figure 3:
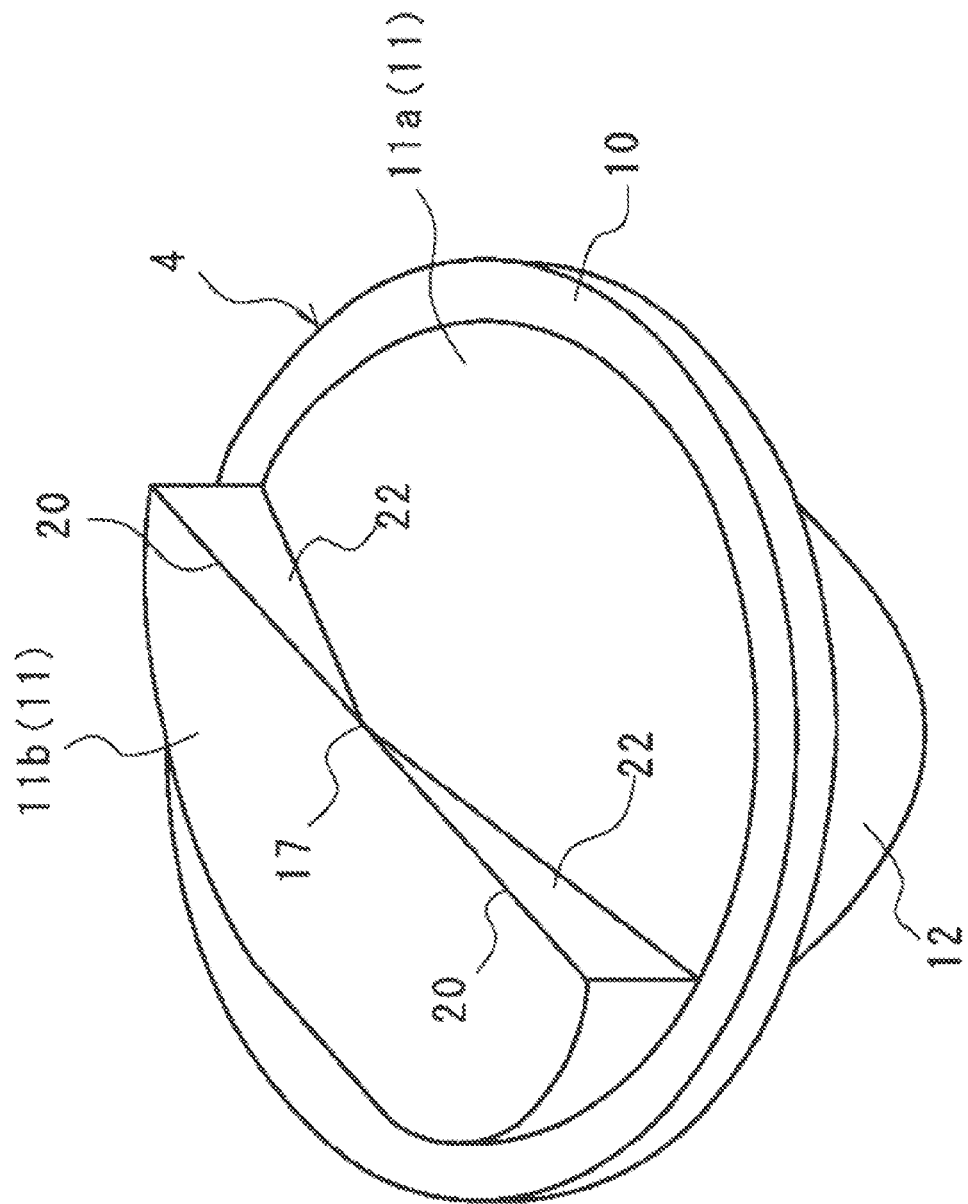
FIG. 3 is an outer perspective view of a first embodiment of a light flux controlling member (an outer view seen from diagonally above)

FIG. 3 and FIG. 4 show a first embodiment of light flux controlling member 4. FIG. 3 is an outer perspective view of a first embodiment of light flux controlling member 4 (an outer view seen from diagonally above). Also, FIG. 4(a) shows a plan view of light flux controlling member 4, FIG. 4(b) shows a left side view of light flux controlling member 4, FIG. 4(c) is a cross sectional view cutting light flux controlling member 4 along line A1-A1, FIG. 4(d) shows a front view of light flux controlling member 4, and FIG. 4(e) shows a rear view of light flux controlling member 4.

Light flux controlling member 4 is formed of a transparent resin material such as PMMA (polymethylmethacrylate), PC (polycarbonate) or EP (epoxy resin), transparent glass, and so on. With this light flux controlling member 4, output surface 11 is formed on the upper surface side of annular flange part 10, and total reflecting surface 12 and input surface 13 are formed on the lower surface side of flange part 10. Consequently, this light flux controlling member 4 is provided on the substrate (not shown) where light emitting element 3 is fixed, so that center axis 14 is placed coaxially with optical axis 8 of light emitting element 3.

Input surface 13 of light flux controlling member 4 is the inner surface of recess 16 formed on the back surface 15 side of light flux controlling member 4 (the shape of its cross section is an isosceles trapezoidal shape), and is formed to constitute circular symmetry around center axis 14. This input surface 13 of light flux controlling member 4 is formed with first input surface 13a, which is the bottom surface of recess 16, and second input surface 13b, which is a taper-shaped cylindrical surface extending from first input surface 13a to the opening edge of recess 16. The inner diameter of second input surface 13b increases gradually from first input surface 13a toward the opening edge such that the inner diameter dimension on the opening edge side is greater than the inner diameter dimension on the first input surface 13a side. Also, back surface 15 of light flux controlling member 4 is an annular plane formed around the opening edge of recess 16 and is a plane that is placed on a virtual plane perpendicular to center axis 14.

Total reflecting surface 12 of light flux controlling member 4 is an outer surface that extends from the outer perimeter edge of back surface 15 to the lower surface of flange part 10, and is a circular symmetrical surface that is formed to surround center axis 14 (that is, an outer surface of a circular truncated cone shape). The outer diameter of this total reflecting surface 12 of light flux controlling member 4 increases gradually from back surface 15 toward flange part 10, and its generatrix is an arc-shaped projecting curved line that extends outward (that is, outward from center axis 14) (see FIGS. 4(b) to (d)).

Figures 4A, 4B:
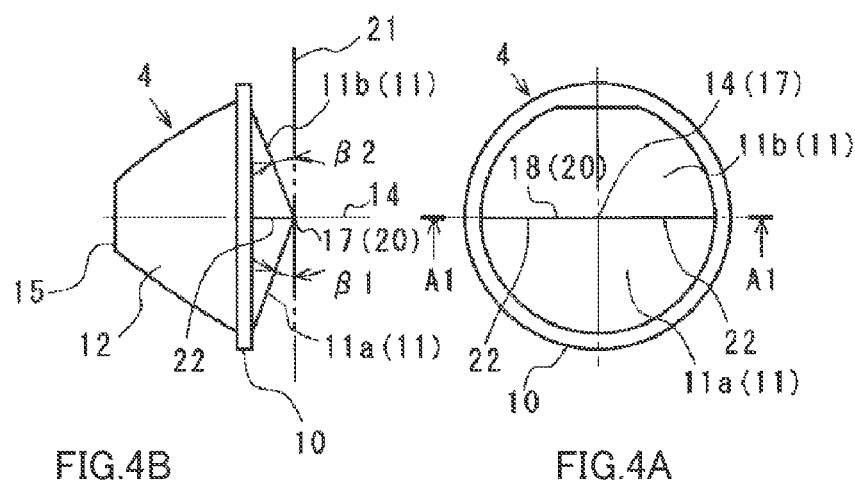
FIGS. 4A-4E shows a first embodiment of a light flux controlling member.
Figure 4C:
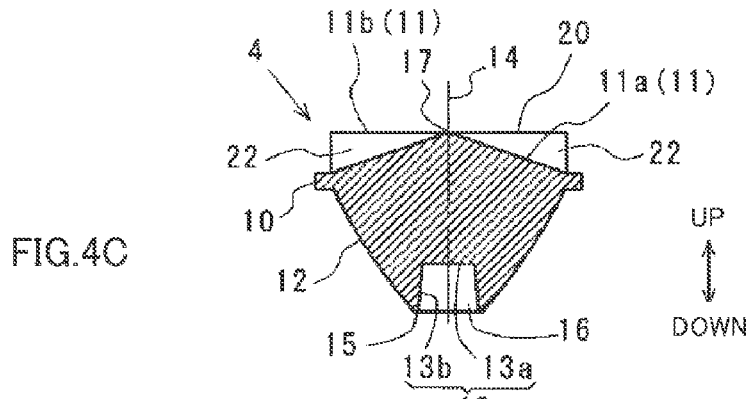
Figure 4D:
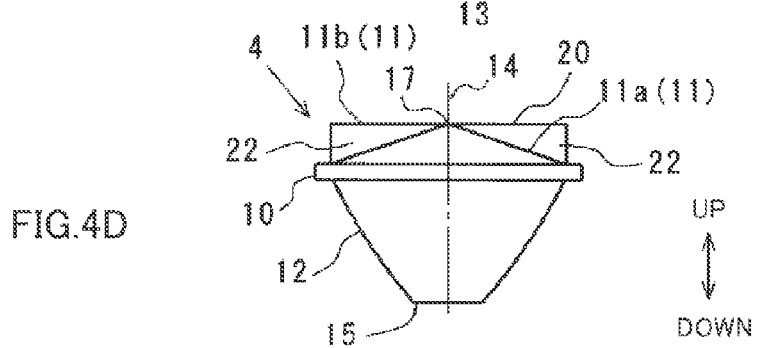
Figure 4E:
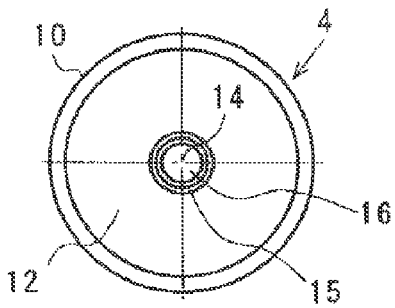

Output surface 11 of light flux controlling member 4 is formed with first output surface 11a, which is placed to be closer to illumination-target surface 6 beyond center axis 14 (optical axis 8), and second output surface 11b, which is placed in a location farther distant from illumination-target surface 6 than this first output surface 11a (see FIG. 2). First output surface 11a of light flux controlling member 4 is an approximately semi-conical, non-spherical surface formed over a 180° angular range around center axis 14, has the intersection line of a cross section including center axis 14 and first output surface 11a as its generatrix, and is a curved surface formed in a ±90° angular range around a rotation axis of center axis 14. Vertex 17 is positioned on center axis 14, and the maximum diameter of the lower edge (edge of flange part 10) is the same as the maximum diameter of total reflecting surface 12. Also, second output surface 11b of light flux controlling member 4 is an inclined surface that is formed such that upper edge (vertex side) 20 along center line 18 is at the same height level as vertex 17 of first output surface 11a and the height (that is, the height from the upper surface of flange part 10 along center axis 14) decreases gradually farther in the direction perpendicular to center line 18, formed in a 180 angular range around the center axis. Now, angle β2 formed between second output surface 11b and virtual plane 21 that is perpendicular to center axis 14 is greater than angle β1 formed between the generatrix of first output surface 11a and virtual plane 21 that is perpendicular to center axis 14 (β2>β1). Also, on a plan view of output surface 11, second output surface 11b is separated from first output surface 11a, by center line 18 that is perpendicular to center axis 14. Also, first output surface 11a and second output surface 11b are connected via a pair of erect walls 22 and 22 which are line-symmetrical about center axis 14. As shown in FIGS. 4(c) and 4(d), these erect walls 22 have a triangular-shaped front surface and are erected from first output surface 11a to second output surface 11b along center axis 14, and part of the light that cannot be output from first output surface 11a to second output surface 11b is output.

With this light flux controlling member 4 configured as described above, in the light from light emitting element 3, the light that is incident from first input surface 13a directly arrives at first output surface 11a and second output surface 11b. Also, the light incident from second input surface 13b is total-reflected and collected by total reflecting surface 12, and then arrives at first output surface 11a and second output surface 11b. Here, in the output light from light flux controlling member 4, light to illuminate a location on illumination-target surface 6 near light flux controlling member 4 will be referred to as "light far from optical axis," and, similarly, in the output light from light flux controlling member 4, light to form a smaller angle with optical axis 8 than "light far from optical axis" will be referred to as "light near optical axis." By forming light flux controlling member 4 such that "light near optical axis" has a greater incidence angle with respect to illumination-target surface 6 than "light far from optical axis 6" (that is, by using light flux controlling member 4 as shown in FIG. 2), first output surface 11a of light flux controlling member 4 outputs light to illuminate illumination-target surface 6 from lower edge 6a to upper edge 6b. Also, from second output surface 11b of light flux controlling member 4, light that travels toward illumination-target surface 6 and that can illuminate illumination-target surface 6 over a wider range in the ±X directions (width directions perpendicular to optical axis 8) than light output from first output surface 11a, is output. Also, light that can illuminate illumination-target surface 6, especially its lower edge 6*a* side (part close to light flux controlling member 4), is output from erect walls 22 of light flux controlling member 4. Also, by making the surface of erect walls 22 rough, it is possible to spread and output light from erect walls 22, and consequently illuminate the lower edge 6*a* side of illumination-target surface 6 uniformly, over a wide range, by the light output from erect walls 22.

Also, angle β2 formed between second output surface 11*b* and virtual plane 21 that is perpendicular to center axis 14, may be equal to angle β1 formed between the generatrix of first output surface 11*a* and virtual plane 21 that is perpendicular to center axis 14 (β2=β1), or may be slightly smaller than angle β1 formed between the generatrix of first output surface 11*a* and virtual plane 21 that is perpendicular to center axis 14 (β2<β1).

Also, this light flux controlling member 4 is positioned with respect to light emitting element 3 and maintain its posture/angle right with respect to light emitting element 3 and illumination-target surface 6 by engaging total reflecting surface 12 in a positing hole in a supporting plate (not shown) and hooking flange part 10 on the upper surface of the supporting plate (not shown).

Advantage of First Embodiment

Figure 5:
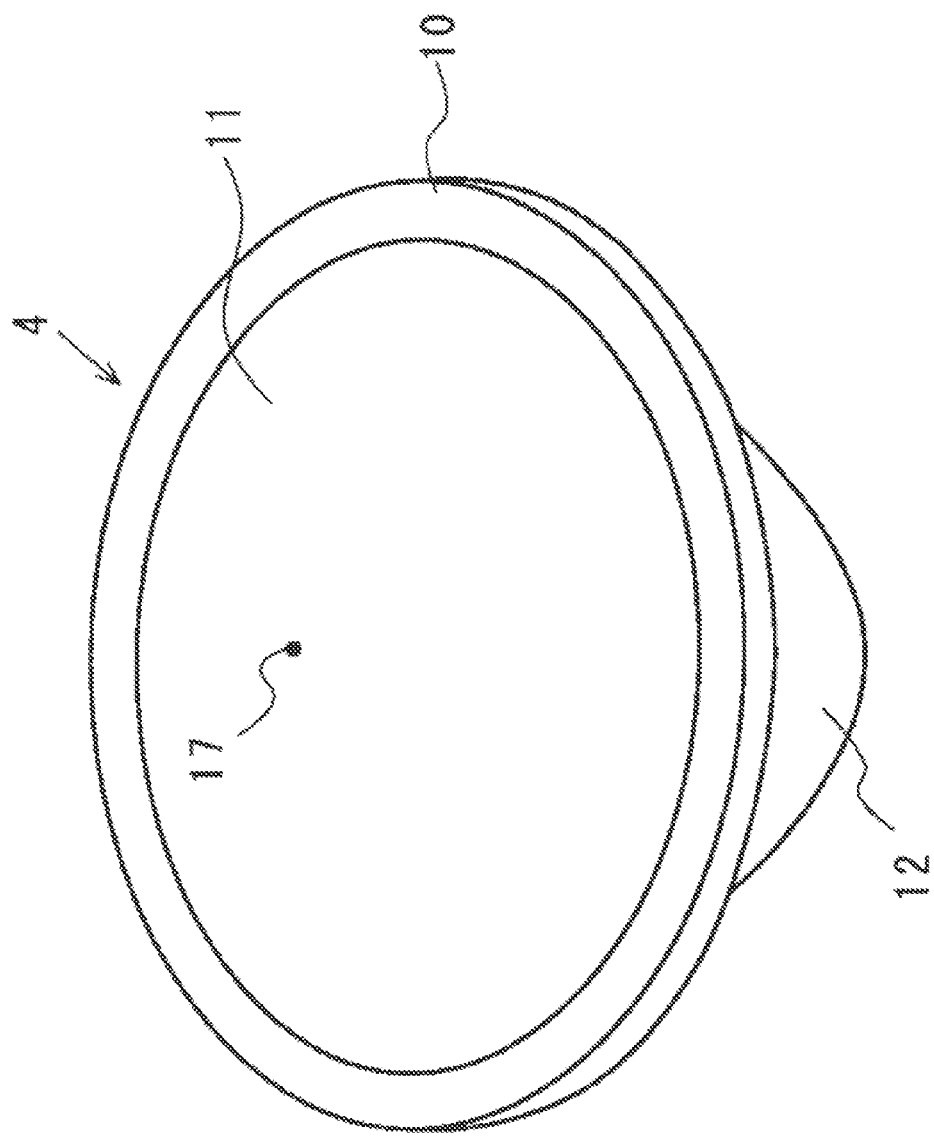
FIG. 5 is an outer perspective view showing a comparative example of a light flux controlling member (an outer view seen from diagonally above)

Advantages of light flux controlling member 4 according to the present embodiment will be described with reference to the comparative example shown in FIG. 5 and FIG. 6. In light flux controlling member 4 of the comparative example shown in FIG. 5 and FIG. 6, the entire range of output surface 11 is formed in the same shape as the shape of first output surface 11*a*. The rest of light flux controlling member 4 of this comparative example is the same as light flux controlling member 4 of the present embodiment. Also, components or elements of light flux controlling member 4 of a comparative example that are the same as those of light flux controlling member 4 of the present embodiment will be assigned the same reference codes and numerals and descriptions that overlap with the descriptions of light flux controlling member 4 of the present embodiment will be omitted.

Figure 7:
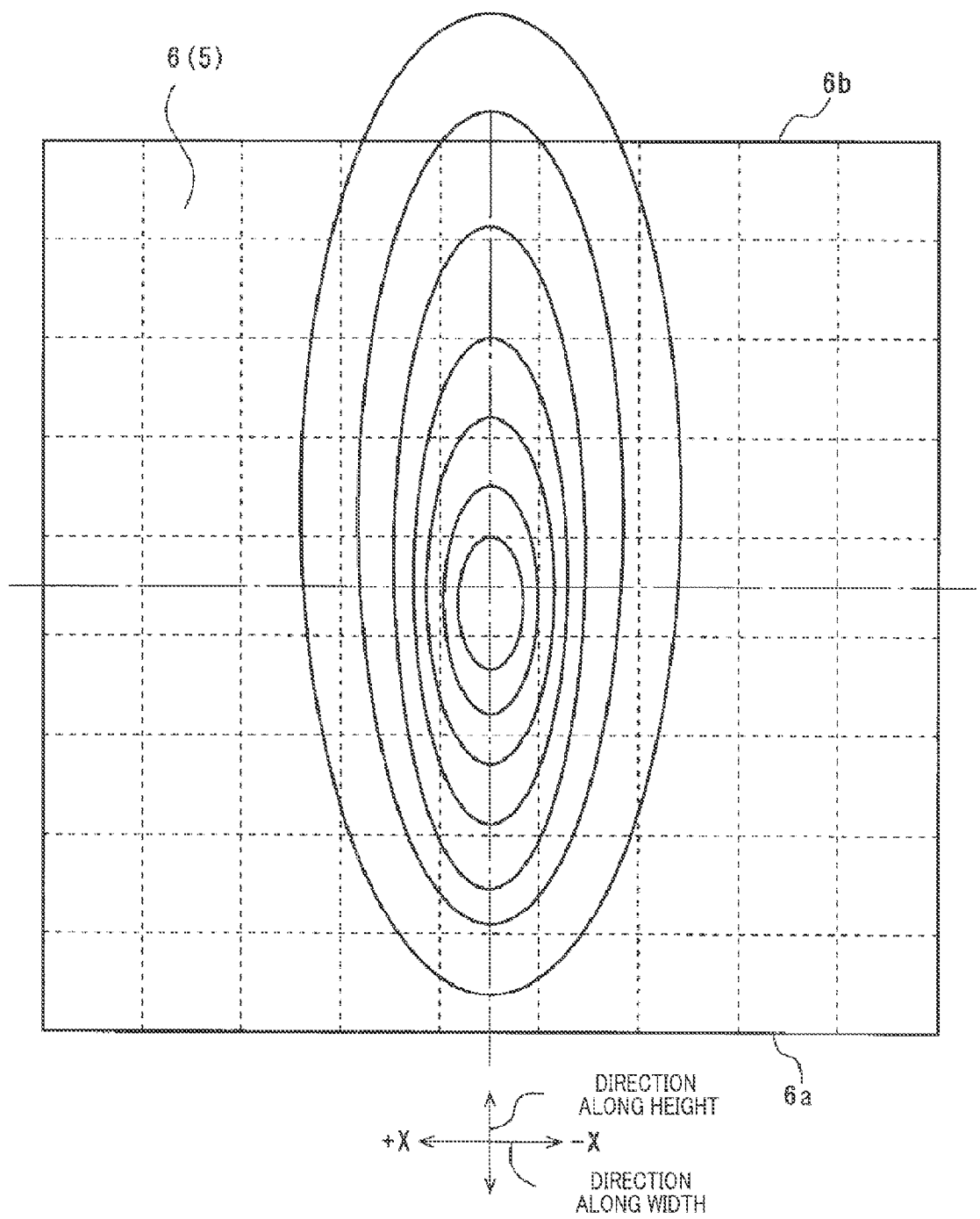
FIG. 7 is a schematic view of distribution of luminance on an illumination-target surface created by illuminating light illuminated from a lighting device using a light flux controlling member according to a comparative example.

FIG. 7 is a schematic view of distribution of luminance on illumination-target surface 6 by the light illuminated upon illumination-target surface 6 from lighting device 2 using light flux controlling member 4 according to a comparative example (see FIG. 2). Also, a plurality of oval-shaped lines in FIG. 7 are contours showing luminance on illumination-target surface 6. These luminance contours have lower values farther from the center part.

Figure 8:
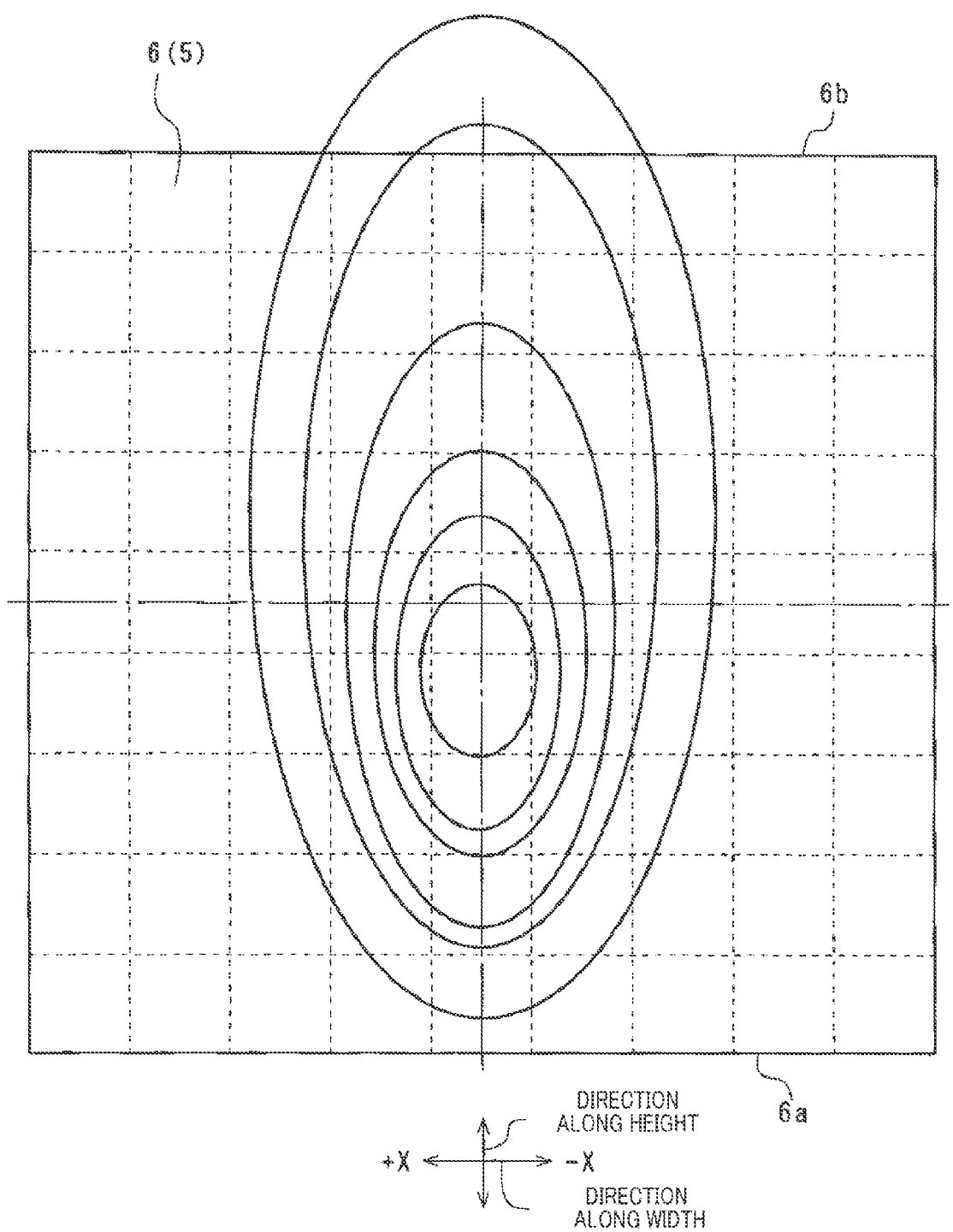
FIG. 8 is a schematic view of distribution of luminance on an illumination-target surface created by illuminating light illuminated from a lighting device using a light flux controlling member according to a first embodiment.

FIG. 8 is a schematic view of distribution of luminance on illumination-target surface 6 by the light illuminated upon illumination-target surface 6 from lighting device 2 using light flux controlling member 4 of the present embodiment. Also, in this drawing too, a plurality of oval-shaped lines are contours to show luminance on illumination-target surface 6.

As clear from a comparison of FIG. 7 and FIG. 8, light flux controlling member 4 according to the present embodiment can widen the area to illuminate on illumination-target surface 6 in the X direction (that is, widen the width to illuminate), compared to light flux controlling member 4 of the comparative example.

Figure 9:
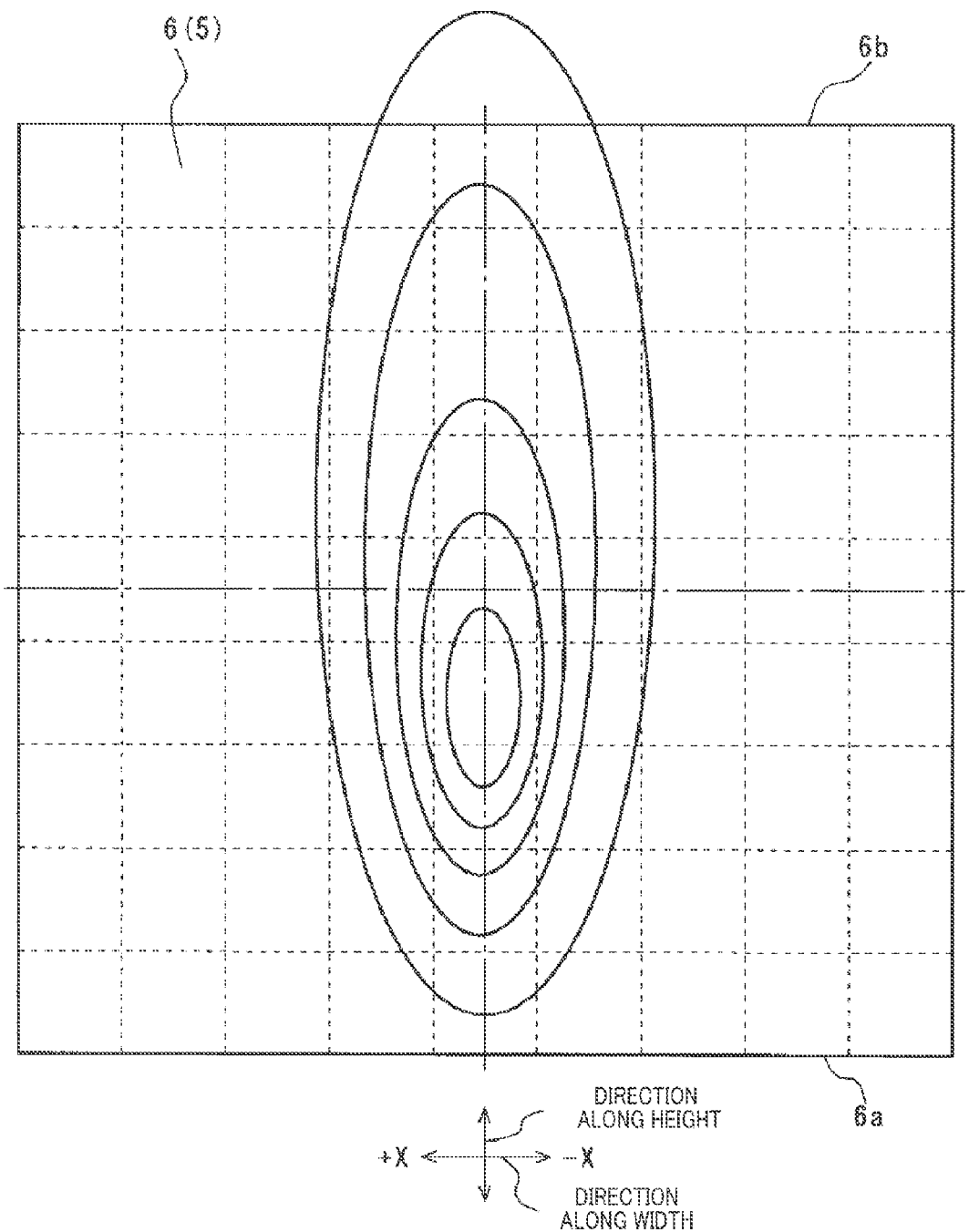
FIG. 9 is a schematic view of distribution of luminance on an illumination-target surface created by illuminating light illuminated only from a first output surface of a light flux controlling member according to a first embodiment.
Figure 10:
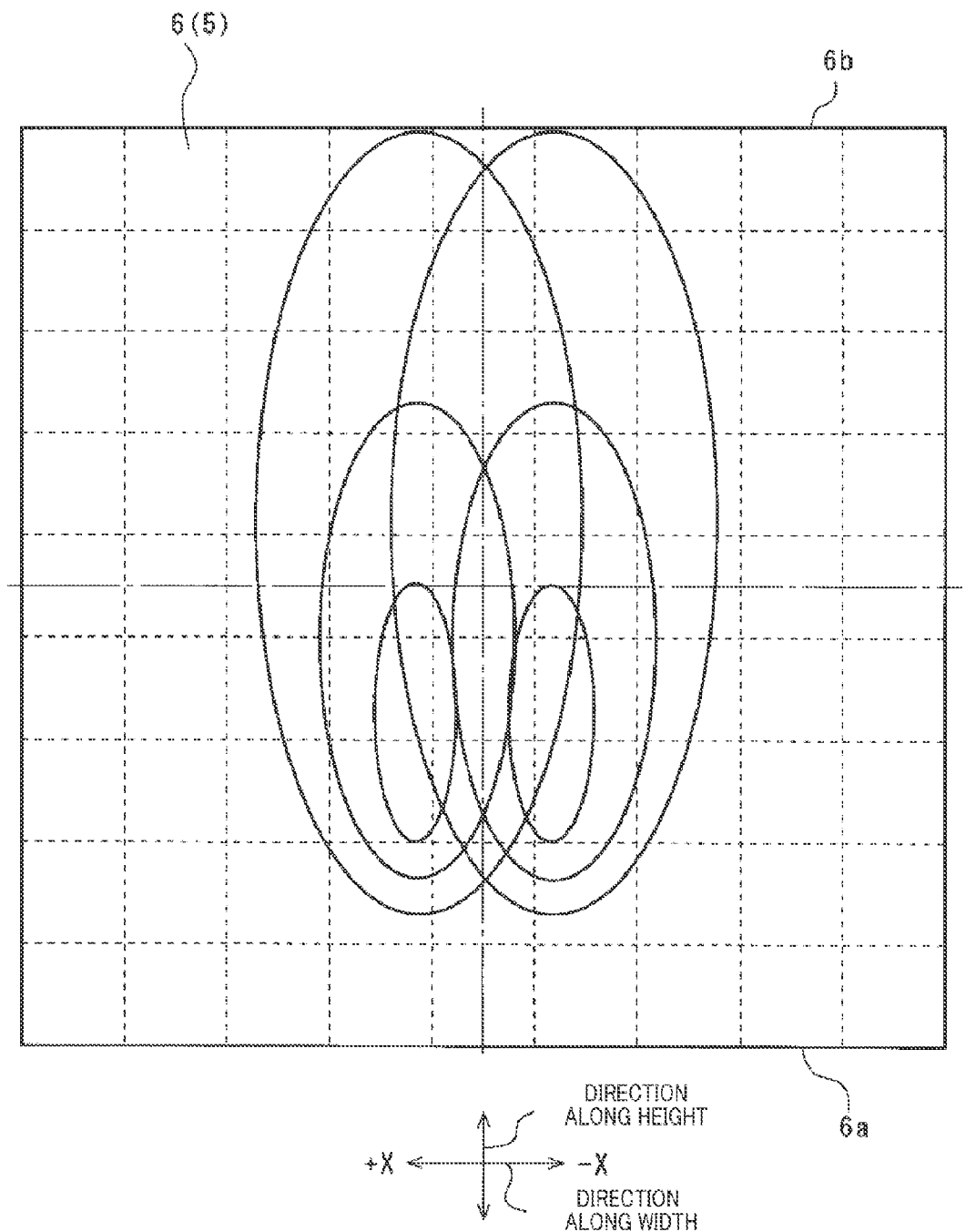
FIG. 10 is a schematic view of distribution of luminance on an illumination-target surface created by illuminating light illuminated only from a second output surface of a light flux controlling member according to a first embodiment.

With this light flux controlling member 4 of the present embodiment, if second output surface 11*b* is covered and illumination-target surface 6 is lighted by means of first output surface 11*a* alone, as shown in FIG. 9, the illuminating light is narrow in the X direction than the area illuminated in FIG. 8, and also has low illuminance. Also, with light flux controlling member 4 according to the present embodiment, if first output surface 11*a* is covered and illumination-target surface 6 is lighted by means of second output surface 11*b* alone, the width in the Z direction is narrower than the illuminated area in FIG. 9, and yet the illuminating light has a wider width in the X direction than the illuminated area shown in FIG. 9 (see FIG. 10). By this means, with light flux controlling member 4 of the present embodiment, the illuminating lights of FIG. 9 and FIG. 10 are superimposed on one another and provides the illuminating light on illumination-target surface 6 shown in FIG. 8. Also, FIGS. 7 to 9 do not show the contours of low-illuminance light arriving at lower edge 6*a* of illumination-target surface 6.

Figure 11B:
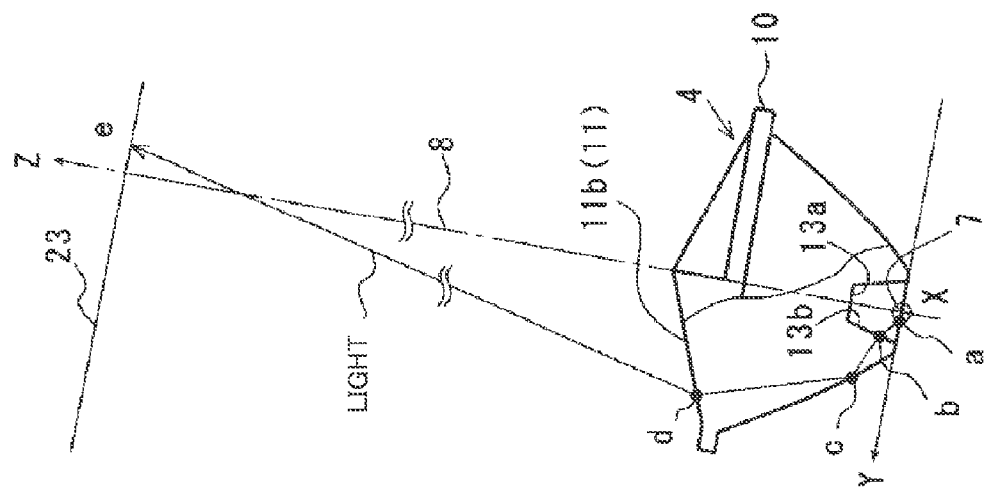
FIG. 11B is a schematic view looking at an optical path from side in the event a light flux controlling member according to a first embodiment is used.
Figure 11A:
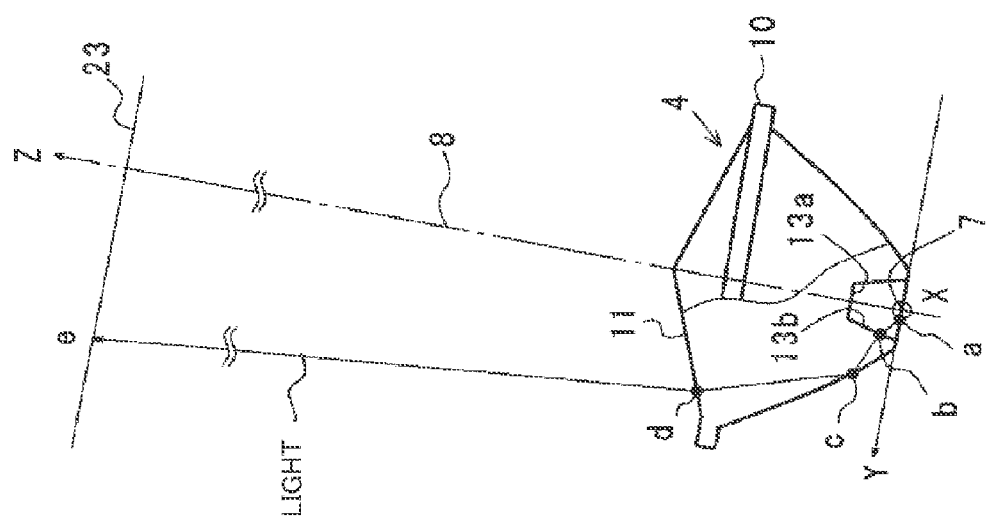
FIG. 11A is a schematic view looking at an optical path from side in the event a light flux controlling member according to a comparative example is used.
Figure 12A:
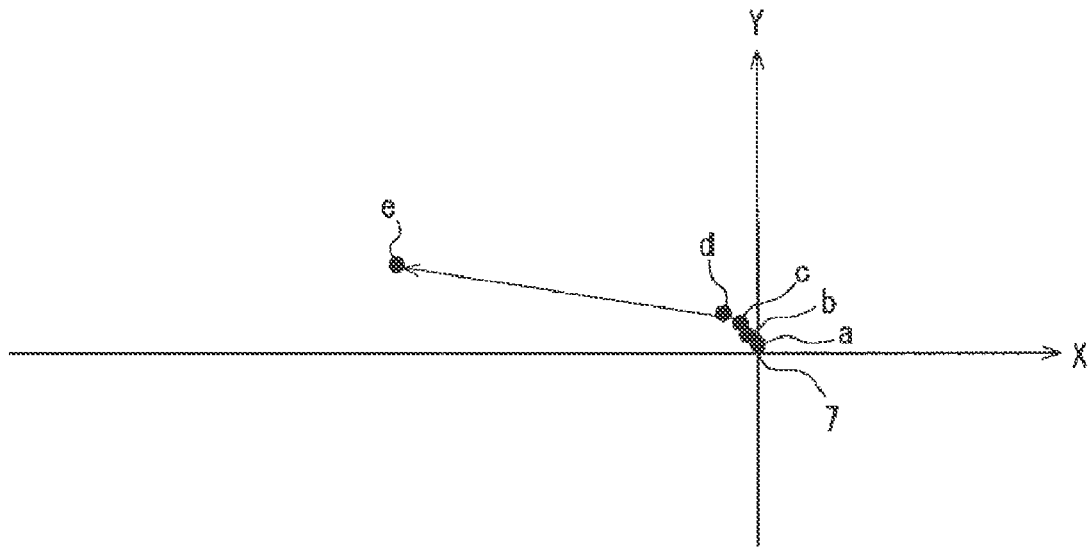
FIG. 12A is a schematic view looking at an optical path from above in the event a light flux controlling member according to a comparative example is used.
Figure 12B:
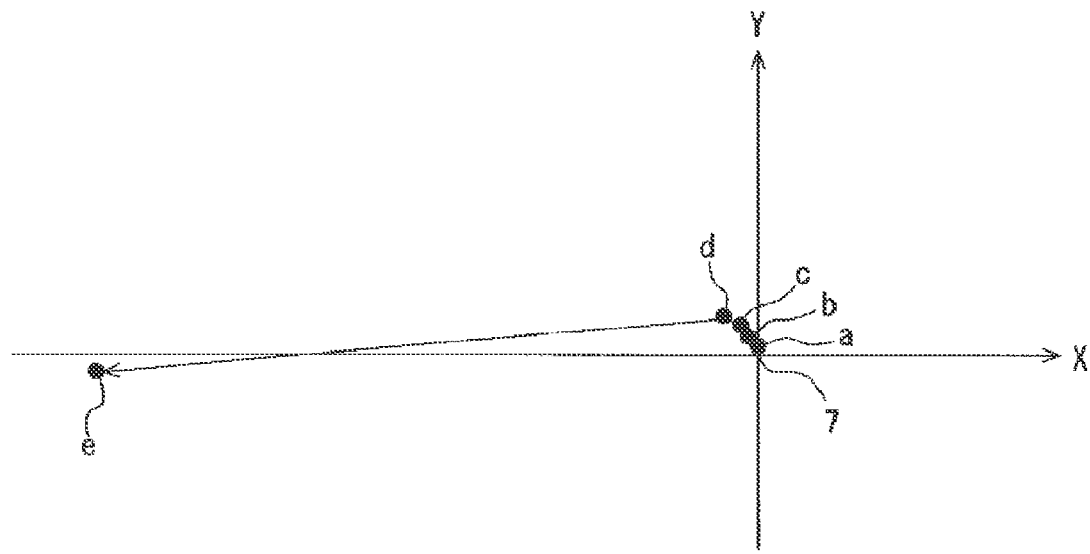
FIG. 12B is a schematic view looking at an optical path from above in the event a light flux controlling member according to a first embodiment is used.

FIG. 11 and FIG. 12 are drawings for explaining differences between output characteristics of second output surface 11*b* of light flux controlling member 4 according to the present embodiment and output characteristics of output surface of light flux controlling member 4 according to the comparative example (area corresponding to second output surface 11*b*), and are schematic views of result of output characteristics found by a simulation experiment. Also, FIG. 11(*a*) and FIG. 12(*a*) are schematic views of a simulation experiment result with respect to light flux controlling member 4 according to the comparative example, and FIG. 11(*b*) and FIG. 12(*b*) are schematic views of a simulation experiment result with respect to light flux controlling member 4 according to the present embodiment. Also, the X axis, Y axis and Z axis in FIG. 11 correspond to the X axis, Y axis and Z axis in FIG. 2. Also, referring to FIG. 11, measurement surface 23 where the output light from light flux controlling member 4 arrives, is a virtual plane that is parallel to the X-Y plane and that is located 1000 mm apart from the X-Y plane along the Z axis direction. Also, FIG. 12 is a plan view looking at measurement surface 23, light flux controlling member 4 and the X-Y plane from the Z axis direction. Then, the X axis and Y axis in FIG. 12 correspond to the X axis and Y axis in FIG. 11, and the Z axis in FIG. 12 extends along the normal direction with respect to the sheet of the drawing.

In these drawings, light emission center 7 on the light emitting surface of the light emitting element is the intersection of the X axis, Y axis and Z axis. Then, in a simulation experiment, focus is placed on the light output from point a, which is a point on the light emitting surface and which is 0.5 mm apart only in the Y axis direction, to find out how that light travels inside light flux controlling member 4 and arrives at which location on measurement surface 23. Then, table 1 and table 2 show the simulation experiment result in numeric values. Table 1 shows a simulation experiment result with respect to light flux controlling member 4 according to the comparative example. Also table 2 shows a simulation experiment result with respect to light flux controlling member 4 according to the present embodiment.

TABLE 1

|   | X | Y | Z |
|---|---|---|---|
| a | 0.0 | 0.5 | 0.0 |
| b | −0.6 | 1.2 | 0.6 |
| c | −1.2 | 2.0 | 1.0 |
| d | −2.2 | 2.6 | 7.0 |
| e | −141.0 | 38.3 | 1000.0 |

(unit of measurement: mm)

TABLE 2

|   | X | Y | Z |
|---|---|---|---|
| a | 0.0 | 0.5 | 0.0 |
| b | −0.6 | 1.2 | 0.6 |
| c | −1.2 | 2.0 | 1.0 |
| d | −2.3 | 2.7 | 7.2 |
| e | −258.8 | −1.6 | 1000.0 |

(unit of measurement: mm)

Point b in FIG. 11 and FIG. 12 is the location where the light output from point a is incident on second input surface 13b of light flux controlling member 4. Also, point c in FIG. 11 and FIG. 12 is the location where the light from point b having entered light flux controlling member 4 is reflected by total reflecting surface 12. Also, point d in FIG. 11 and FIG. 12 is the location where the light reflected in point d on total reflecting surface 12 arrives at output surface 11 (11b) (the location of emission from output surface 11 (11b)). Also, point e in FIG. 11 and FIG. 12 is the location where the light output from point d on output surface 11 (11b) of light flux controlling member 4 arrives at measurement surface 23.

As obvious from the above simulation experiment results, the shape of input surface 13 and the shape of total reflecting surface 12 are the same between light flux controlling member 4 according to the comparative example and light flux controlling member 4 of the present embodiment, so that the locations of point a to point c are also the same. However, since the shape of output surface 11 of light flux controlling member 4 according to the comparative example and the shape of output surface 11 (second output surface 11b) of light flux controlling member 4 according to the present embodiment are different, point d and point e vary between light flux controlling member 4 according to the comparative example and light flux controlling member 4 according to the present embodiment. In particular, point e differs significantly between light flux controlling member 4 according to the comparative example and light flux controlling member 4 according to the present embodiment. That is to say, the light output from second output surface 11b of light flux controlling member 4 according to the present embodiment arrives at a location (point e) on measurement surface 23 that is a (1.8 times) greater distance apart from the Z axis in the −X direction, compared to the light output from output surface 11 of light flux controlling member 4 according to the comparative example, and arrives at a location (point e) on measurement surface 23 in the −Y direction. The −Y direction in FIG. 11 and FIG. 12 is closer to illumination-target surface 6 beyond optical axis 8 in FIG. 2. Consequently, second output surface 11b of light flux controlling member 4 of the present embodiment makes it possible to control the light that cannot arrive at illumination-target surface 6 by means of output surface 11 of light flux controlling member 4 according to the comparative example, to travel toward illumination-target surface 6, improve the efficiency of use of light for illuminating illumination-target surface 6, and, furthermore, emit light on illumination-target surface 6 over a wide range in the width direction (±X direction).

As described above, by using light flux controlling member 4 according to the present embodiment, light emitting device 1 and lighting device 2 do not require reflecting members as used in prior art, and, by removing such reflecting members that are no longer necessary, it is possible to simplify the structure, reduce the number of components and elements, and lower the product cost.

Also, by using light flux controlling member 4 according to the present embodiment, it is possible to miniaturize light emitting device 1 and lighting device 2 compared to prior art, and reduce the footprint space compared to prior art.

Also, light emitting device 1 and lighting device 1 using light flux controlling member 4 according to the present embodiment use light emitting element 3 (LED, for example), so that it is possible to save power compared to prior art to use a halogen lamp or a discharge lamp as a light source.

Second Embodiment of Light Flux Controlling Member

Figure 13:
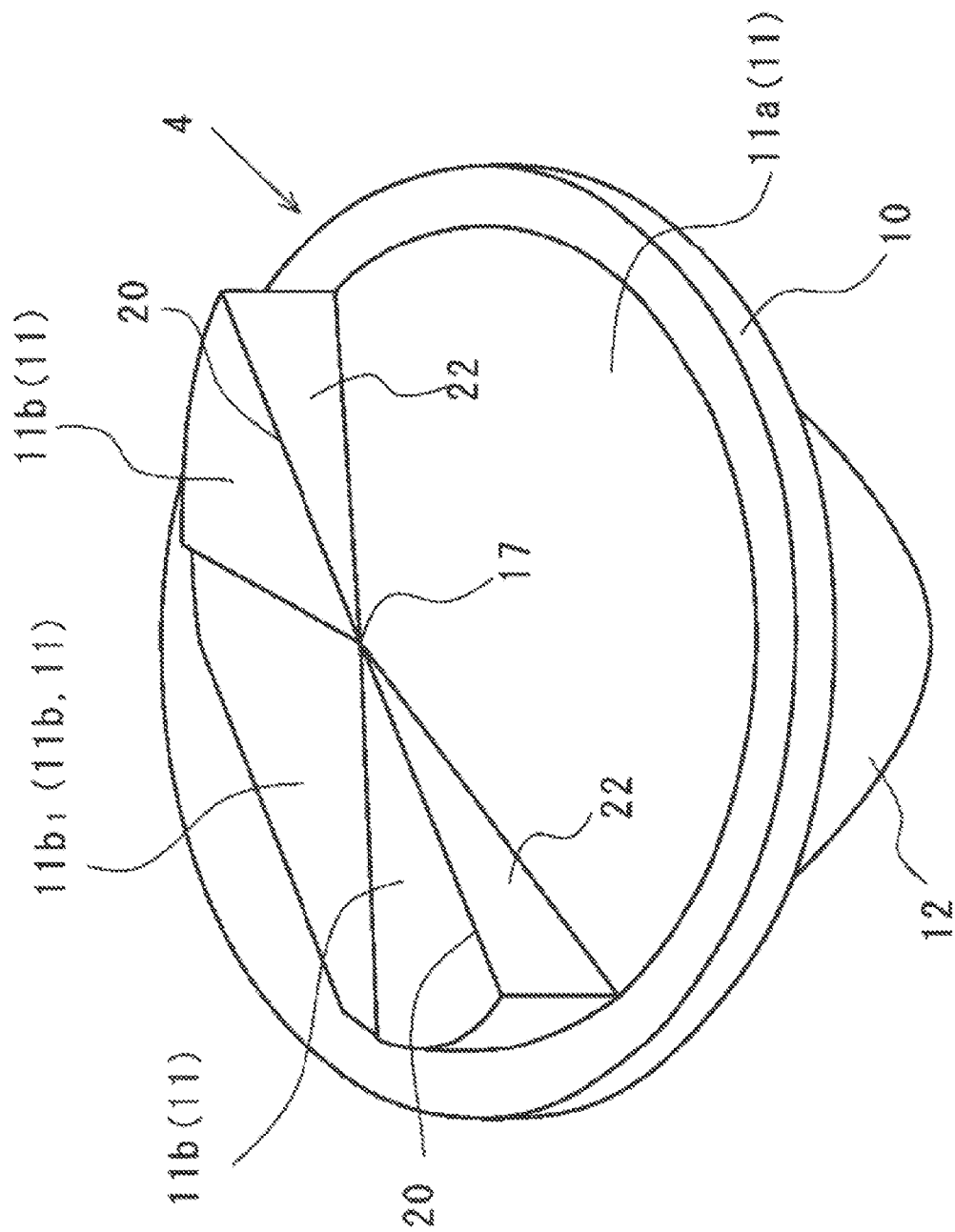
FIG. 13 is an outer perspective view showing a second embodiment of a light flux controlling member (an outer view seen from diagonally above)
Figures 14A, 14B:
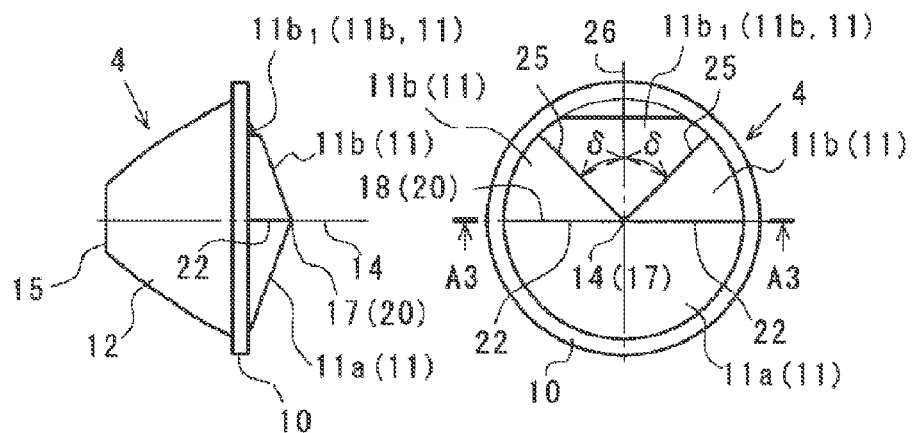
FIGS. 14A-14E shows a second embodiment of a light flux controlling member.
Figure 14C:
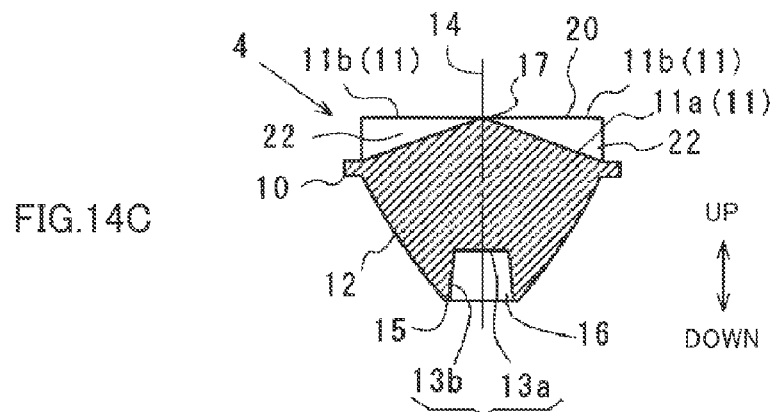
Figure 14D:
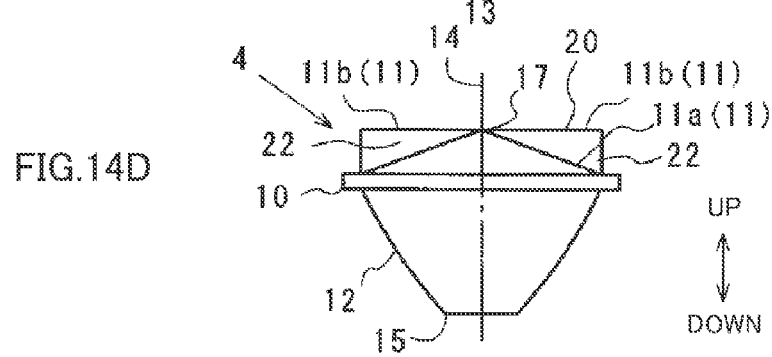
Figure 14E:
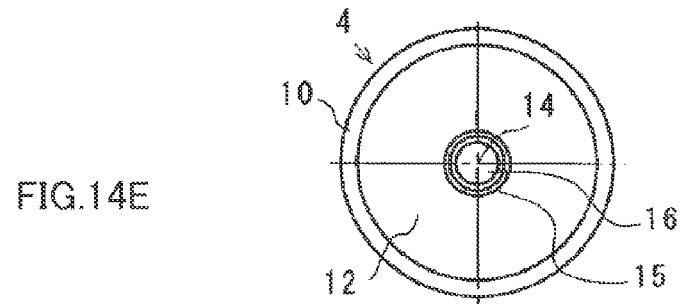

FIG. 13 and FIG. 14 show a second embodiment of light flux controlling member 4 according to the present invention. As shown in these drawings, with light flux controlling member 4 of the present embodiment, the shape of second output surface 11b is different from light flux controlling member 4 of the first embodiment. The rest of light flux controlling member 4 of the present embodiment is the same as light flux controlling member 4 according to the first embodiment. Also, components or elements of light flux controlling member 4 according to the present embodiment that are the same as those of light flux controlling member 4 of the first embodiment will be assigned the same reference codes and numerals and descriptions that overlap with the descriptions of light flux controlling member 4 of the first embodiment will be omitted.

As shown in FIG. 13 and FIG. 14, in light flux controlling member 4 according to the present embodiment, steep inclined surface $11b_1$ is formed in the center part of second output surface 11b. On a plan view of FIG. 14(a), this steep inclined surface $11b_1$ is formed to be line-symmetrical with respect to center line 26 and is formed in the shape of a fan from vertex 17 of first output surface 11a, so that the angle formed between border line 25 of a different part of second output surface 11b and center line 26 is predetermine angle δ (which is 45° with the present embodiment). Also, the area proportion of steep inclined surface $11b_1$ in second output surface 11b is set to be an optimal value by changing the angle of δ depending on what output light characteristics are required.

By using this light flux controlling member 4 according to the present embodiment configured as described above, it is possible to achieve the same advantage as by using the first embodiment, and realize lighting to exhibit a different luminance distribution from the luminance distribution of illuminating light by light flux controlling member 4 according to the first embodiment.

Third Embodiment of Light of Flux Controlling Member

Figure 15:
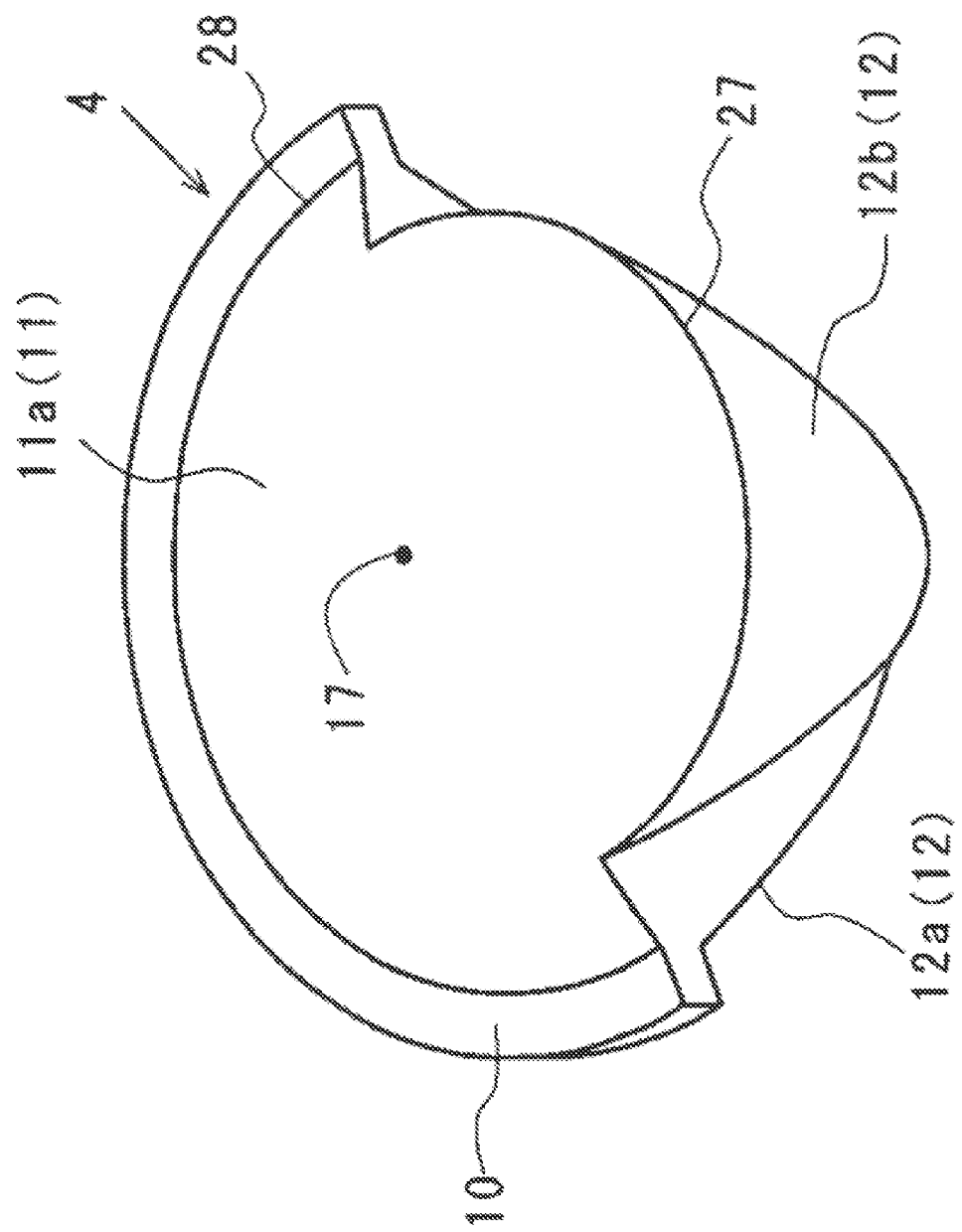
FIG. 15 is an outer perspective view showing a third embodiment of a light flux controlling member (an outer view seen from diagonally above)
Figure 16B:
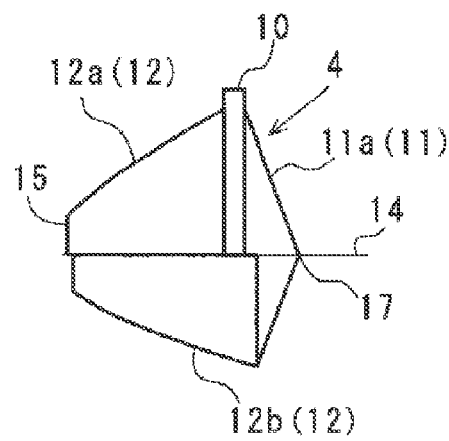
FIGS. 16A-16E shows a third embodiment of a light flux controlling member.
Figure 16A:
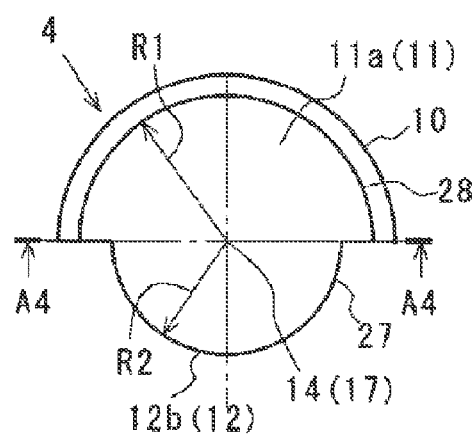
Figure 16C:
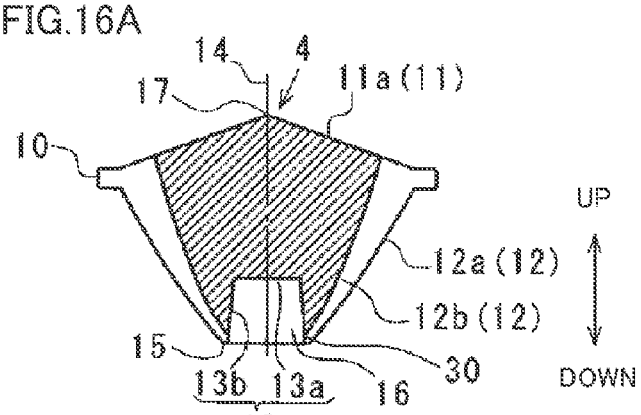
Figure 16D:
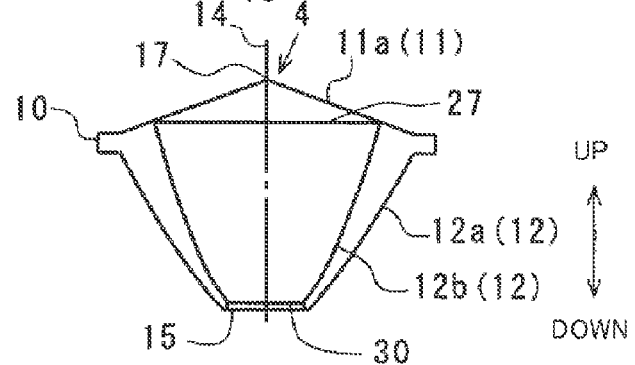
Figure 16E:
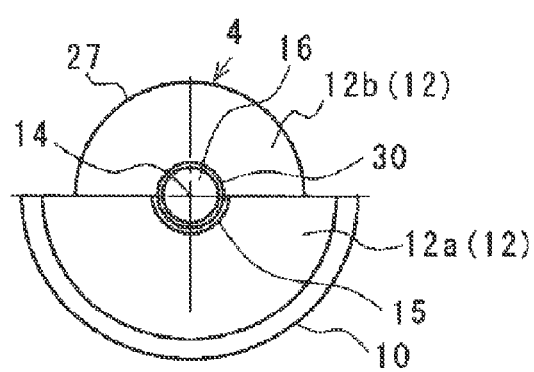

FIG. 15 and FIG. 16 show a third embodiment of light flux controlling member 4 according to the present invention. With light flux controlling member 4 of the present embodiment shown in these drawings, no part that is the same as second output surface 11b of light flux controlling member 4 according to the first embodiment is formed on output surface 11, and half of total reflecting surface 12 has a different shape from light flux controlling member 4 according to the first embodiment. The rest of light flux controlling member 4 according to the present embodiment is the same as light flux controlling member 4 of the first embodiment. Also, components or elements of light flux controlling member 4 of the present embodiment that are the same as those of light flux controlling member 4 of the first embodiment will be assigned the same reference codes and numerals and descriptions that overlap with the descriptions of light flux controlling member 4 of the first embodiment will be omitted.

As shown in FIG. 15 and FIG. 16, with light flux controlling member 4 according to the present embodiment, total reflecting surface 12 is formed with first total reflecting surface 12*a* and second total reflecting surface 12*b*. Assuming that light flux controlling member 4 of the first embodiment is divided into two along center axis 14, first total reflecting surface 12*a* has the same shape as either one total reflecting surface 12. Also, assuming that light flux controlling member 4 of the first embodiment is divided into two along center axis 14, second total reflecting surface 12*b* is formed by making the diameter of the other total reflecting surface 12 smaller so that reflecting light approaches the optical axis closer than on the first total reflecting surface 12*a* side. That is to say, second total reflecting surface 12*b* is formed such that its radius R2 in output surface side edge 27 (upper edge) is smaller than radius R1 in perimeter edge 28 (edge connected with the flange part) of output surface 11*a* (11) (R2<R1) and its lower edge 30 is located near the opening edge of recess 16 (see FIGS. 16(*a*) and (*c*)). As a result of this, compared to first total reflecting surface 12*a*, second total reflecting surface 12*b* rises sharply toward output surface 11 from the back surface 15 side.

With this light flux controlling member 4 according to the present embodiment, when constituting lighting device 2 instead of light flux controlling member 4 according to the first embodiment, first total reflecting surface 12*a* is placed closer to illumination-target surface 6 beyond optical axis 8 and second total reflecting surface 12*b* is located on the farther side from illumination-target surface 6.

Using this light flux controlling member 4 according to the present embodiment, it is possible to achieve the same advantage as when using light flux controlling member 4 of the first embodiment.

Also, by applying second total reflecting surface 12*b* of light flux controlling member 4 according to the present embodiment to light flux controlling member 4 of the first and second embodiments and adjusting the surface shape such that the reflecting light on second total reflecting surface 12*b* becomes light to illuminate illumination-target surface 6, it is possible to improve the efficiency of use of light for illuminating illumination-target surface 6.

Fourth Embodiment of Light Flux Controlling Member

Figure 17:
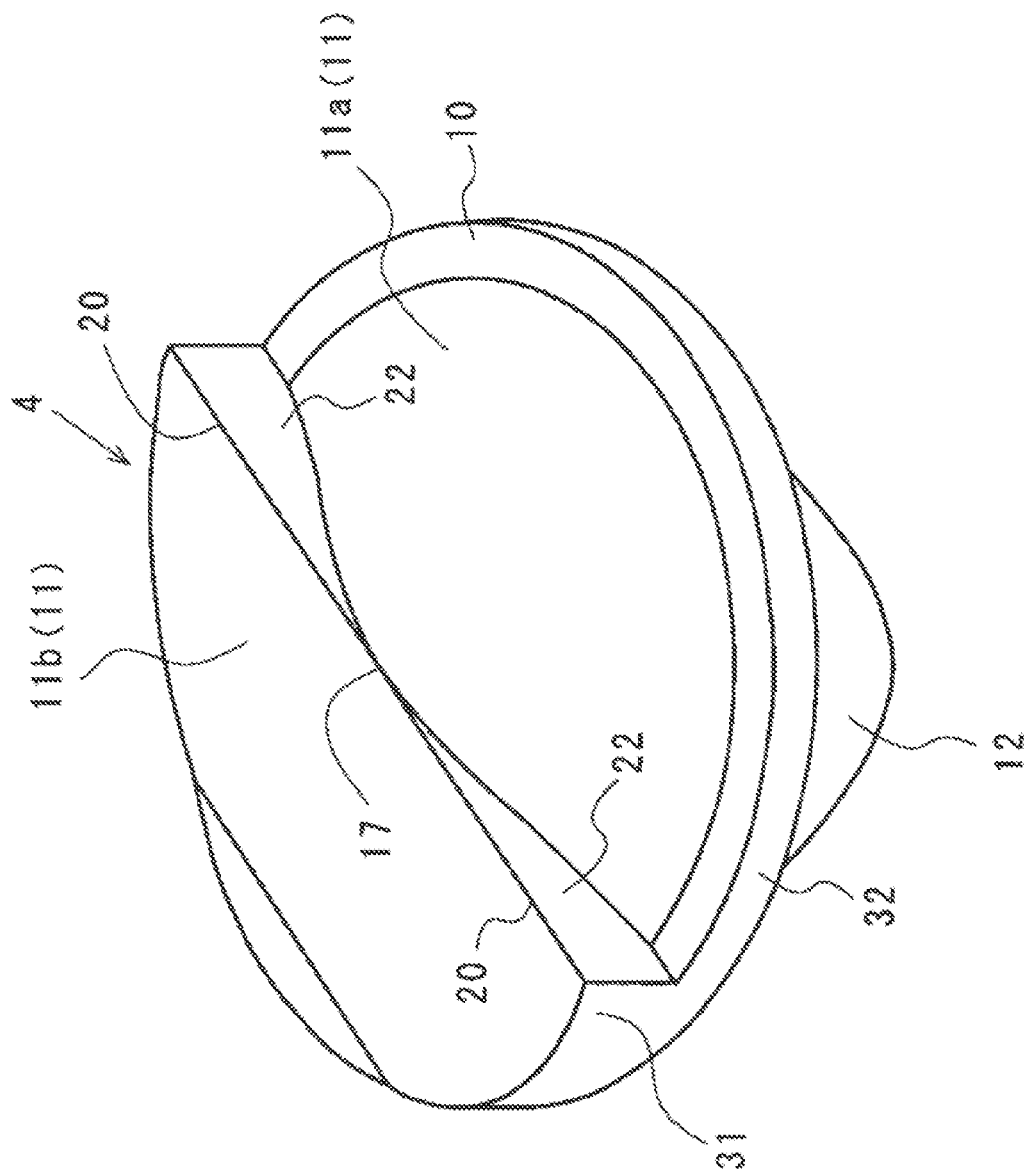
FIG. 17 is an outer perspective view showing a fourth embodiment of a light flux controlling member (an outer view seen from diagonally above)
Figures 18A, 18B:
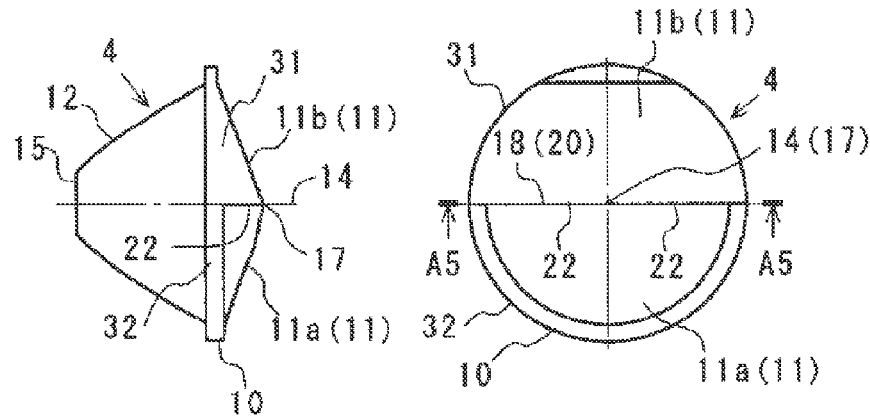
FIGS. 18A-18E shows a fourth embodiment of a light flux controlling member.
Figure 18C:
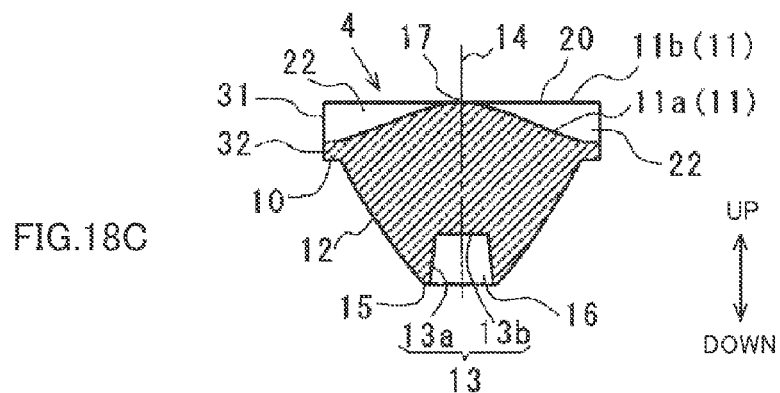
Figure 18D:
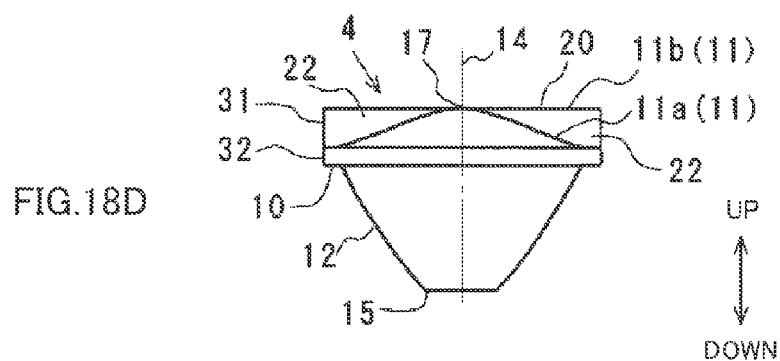
Figure 18E:
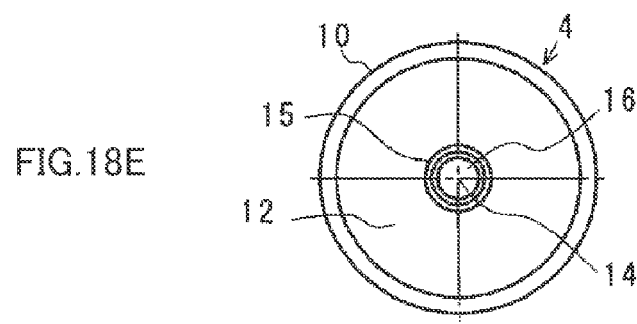
Figure 20F:
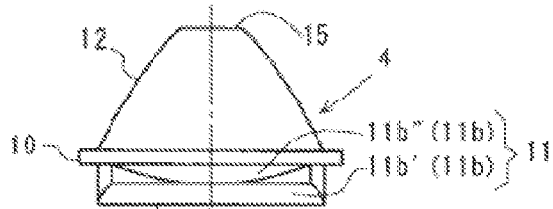
FIGS. 20A-20F shows a fifth embodiment of a light flux controlling member.
Figure 20B:
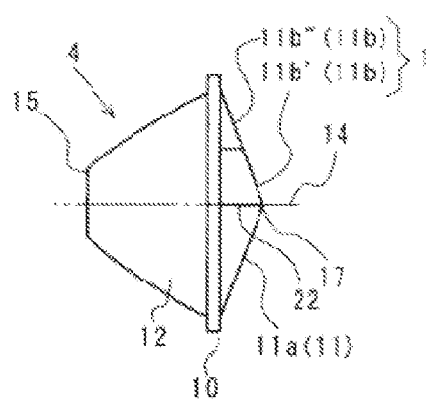
Figure 20A:
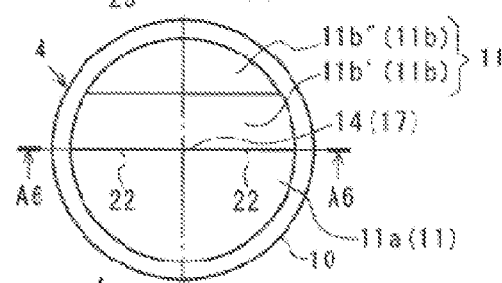
Figure 20C:
Figure 20D:
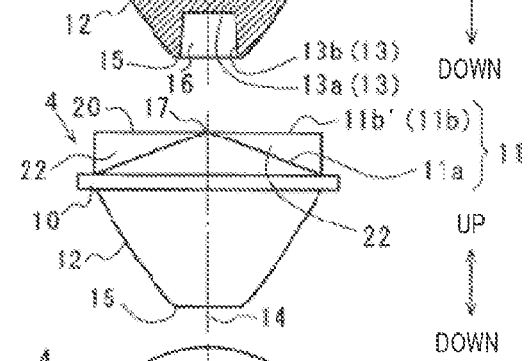
Figure 20E:
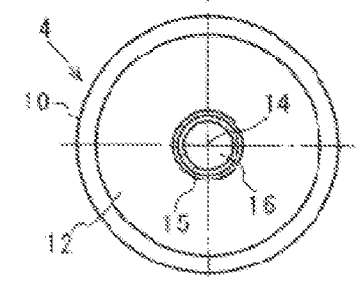

FIG. 17 and FIG. 18 show a fourth embodiment of light flux controlling member 4 of the present invention. With light flux controlling member 4 of the present embodiment shown in these drawings, the shape of first output surface 11*a* and the shape of second output surface 11*b* are different from light flux controlling member 4 of the first embodiment. The rest of light flux controlling member 4 according to the present embodiment is the same as light flux controlling member 4 of the first embodiment. Also, components or elements of light flux controlling member 4 of the present embodiment that are the same as those of light flux controlling member 4 of the first embodiment will be assigned the same reference codes and numerals and descriptions that overlap with the descriptions of light flux controlling member 4 of the first embodiment will be omitted.

As shown in FIG. 17 and FIG. 18, with light flux controlling member 4 according to the present embodiment, the shape of first output surface 11*a* is a non-spherical surface, and this is different from light flux controlling member 4 of the first embodiment in which the shape of first output surface 11*a* is an approximately semi-conical shape. Also, with light flux controlling member 4 of the present embodiment, outer perimeter surface 31 of second output surface 11*b* is formed in a size to match with outer perimeter surface 32 of flange part 10, so that the area of second output surface 11*b* is greater than the area of second output surface 11*b* of light flux controlling member 4 according to the first embodiment.

By using light flux controlling member 4 according to the present embodiment configured as described above, it is possible to achieve the same advantage as by light flux controlling member 4 of the first embodiment, and, by using flange part 10 as an optical surface, it is possible to illuminate a wider range than light flux controlling member 4 of the first embodiment.

Also, by applying second total reflecting surface 12*b* of light flux controlling member 4 according to the third embodiment to light flux controlling member 4 of the present embodiment and adjusting the surface shape such that the reflecting light on second total reflecting surface 12*b* becomes light to illuminate illumination-target surface 6, it is possible to improve the efficiency of use of light for illuminating illumination-target surface 6.

Furthermore, given that the shape of first output surface 11*a* of light flux controlling member 4 of the present embodiment is a non-spherical shape, it is possible to realize lighting to exhibit a different luminance distribution from light flux controlling member 4 according to the first embodiment in which the shape of first output surface 11*a* is an approximately semi-conical shape.

Fifth Embodiment of Light Flux Controlling Member

FIG. 19 and FIG. 20 show a fifth embodiment of light flux controlling member 4 according to the present invention. With light flux controlling member 4 of the present embodiment shown in these drawings, the shape of second output surface 11*b* is different from light flux controlling member 4 of the first embodiment. The rest of light flux controlling member 4 according to the present embodiment is the same as light flux controlling member 4 of the first embodiment. Also, components or elements of light flux controlling member 4 of the present embodiment that are the same as those of light flux controlling member 4 of the present embodiment will be assigned the same reference codes and numerals and descriptions that overlap with the descriptions of light flux controlling member 4 of the first embodiment will be omitted.

As shown in FIG. 19 and FIG. 20, with light flux controlling member 4 according to the present embodiment, part of second output surface 11*b* of light flux controlling member 4 according to the first embodiment is formed in the same shape (that is, an approximately conical shape) as the shape of first output surface 11*a*. That is to say, referring to the plan view of FIG. 20(*a*), second output surface 11*b* of light flux controlling member 4 is formed such that band-shaped part 11*b*' of a predetermined width dimension from center line 18 is formed the same as second output surface 11*b* of light flux controlling member 4 according to the first embodiment, and the rest of part 11*b*" is formed in the same shape as first output surface 11*a*.

By using light flux controlling member 4 according to the present embodiment configured as described above, it is possible to achieve the same advantage as by light flux controlling member 4 of the first embodiment, and realize lighting to exhibit a different luminance distribution from the luminance distribution of illuminating light by light flux controlling member 4 according to the first embodiment.

Also, by applying second total reflecting surface 12b of light flux controlling member 4 according to the third embodiment to light flux controlling member 4 of the present embodiment and adjusting the surface shape such that the reflecting light on second total reflecting surface 12b becomes light to illuminate illumination-target surface 6, it is possible to improve the efficiency of use of light for illuminating illumination-target surface 6.

Variations of Embodiments

With light flux controlling member 4 according to each embodiment described above, the shape of first output surface 11a is, for example, a shape dividing a conical surface along center axis 14, a shape dividing a non-spherical surface along center axis 14, and so on, the present invention is by no means limited to these, and the shape of first output surface 11a may be a semispherical shape or the shape of first output surface 11a may as well be formed to be a plane that is parallel to back surface 15.

Also, a plurality of light emitting devices 1, using one of light flux controlling members 4 according to the above embodiments, are placed at adequate intervals, depending on the size of illumination-target surface 6.

Also, although lighting device 2 according to the above embodiment has been described to place light emitting device 1 diagonally below in front of illumination-target surface 6, the present invention is by no means limited to this, and it is equally possible to turn lighting device 2 upside down (that is, rotate lighting device 2 through 180°), place light emitting device 1 diagonally above in front of illumination-target surface 6, and illuminate illumination-target surface 6, by means of light emitting device 1, from diagonally above in the front. Also, it is equally possible to rotate light emitting device 1 according to the above embodiment through 90° around the normal with respect to illumination-target surface 6 situated near the center of illumination-target surface 6 as a rotation axis, move light emitting device 1 in a direction parallel to the X axis and illumination-target surface 6, adjust the location of light emitting device 1 with respect to illumination-target surface 6, place light emitting device 1 diagonally forward from illumination-target surface 6 to the left or right, and illuminate illumination-target surface 6 by that light emitting device 1 from diagonally forward to the left or right. Also, it is equally possible to rotate light emitting device 1 according to the above embodiment through certain degrees depending on the size of illumination-target surface 6, move light emitting device 1 in a direction parallel to illumination-target surface 6, adjust the location of light emitting device 1 with respect to illumination-target surface 6, place light emitting device 1 to meet a corner part of illumination-target surface 6, and illuminate illumination-target surface 6 by that light emitting device 1 from that corner part. Also, it is preferable to adjust the elevation angle of light emitting device 1 according to the location of light emitting device 1 with respect to illumination-target surface 6.

(Holder of Light Flux Controlling Member)

Figure 21:
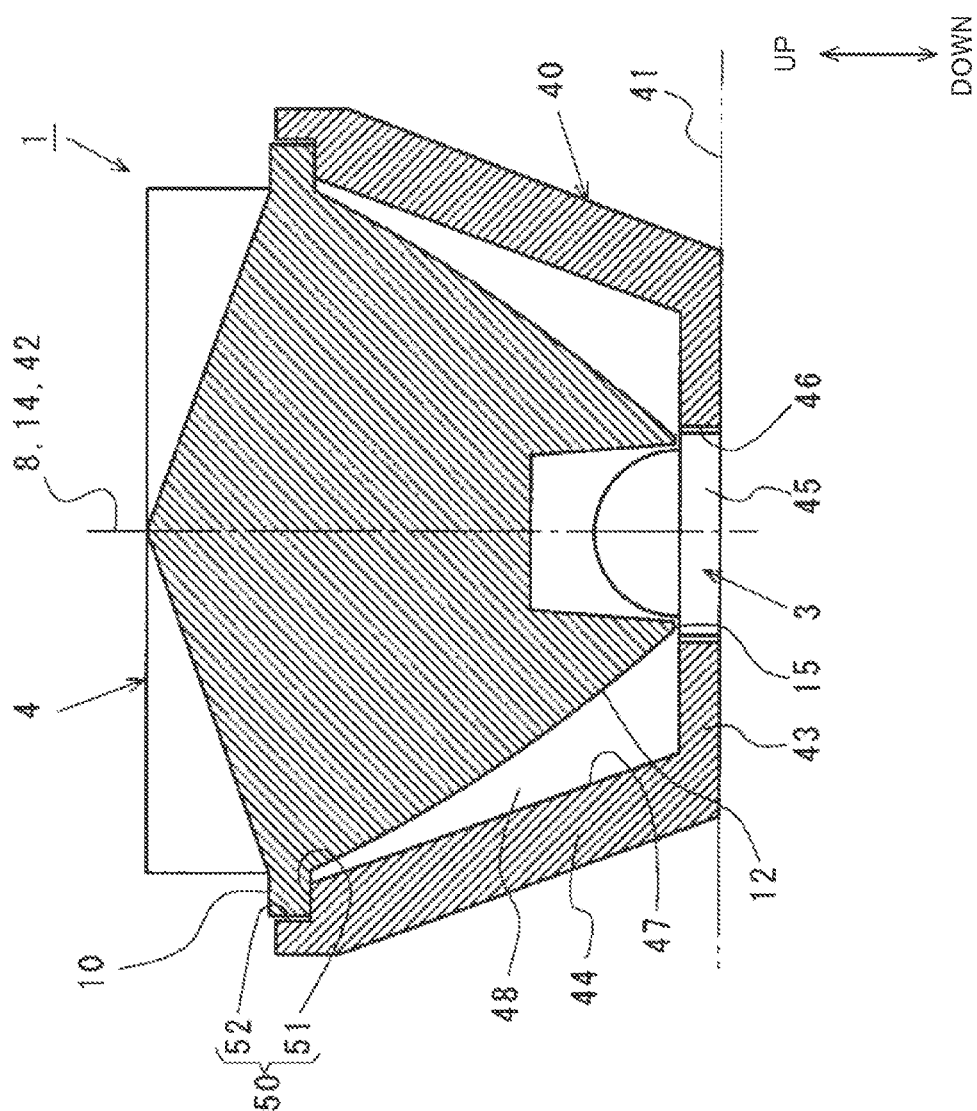
FIG. 21 is a cross sectional view showing a state of engagement of a light emitting element on a substrate and a holder, and a state of engagement of a light flux controlling member and a holder.
Figure 22A:
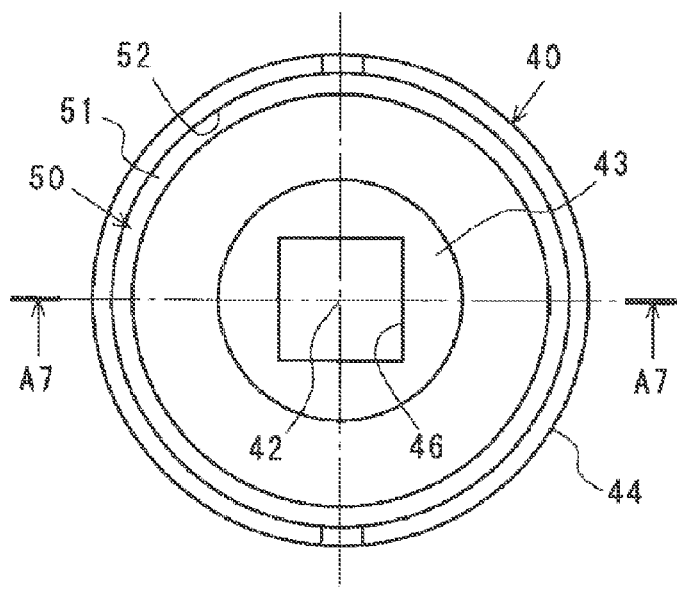
FIGS. 22A-22C shows a holder.
Figure 22B:
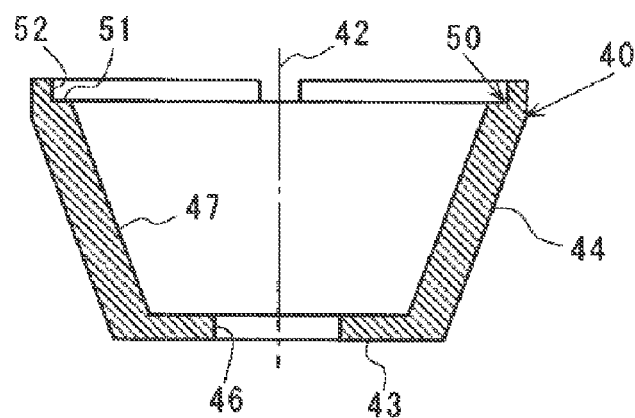
Figure 22C:
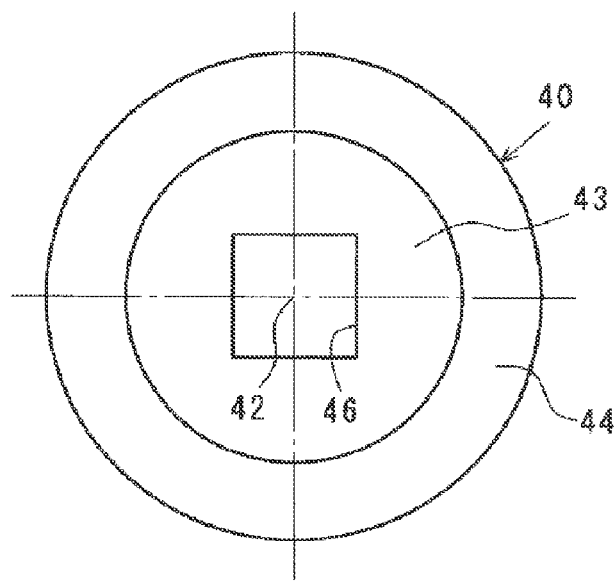

FIG. 21 and FIG. 22 show views related to holder 40 that is used to maintain light flux controlling member 4 in a state in which light flux controlling member 4 is positioned with respect to light emitting element 3 (LED, for example). Of these, FIG. 21 is a cross sectional view showing the state of engagement of light emitting element 3 on substrate 41 and holder 40, and the state of engagement state of light flux controlling member 4 and holder 40. Also, FIG. 22(a) is a plan view of holder 40, FIG. 22(b) is a cross sectional view of holder 40 cut along line A7-A7 in FIG. 22(a), and FIG. 22(c) is a rear view of holder 40.

As shown in these drawings, holder 40 is a bottomed cylindrical body, and has disc-shaped bottom part 43 that is perpendicular to center axis 42, and cylindrical part 44 in which the inner diameter dimension gradually increases farther from that bottom part 43.

Then, in bottom part 43 of holder 40, square-shaped throughhole 46 for accommodating prism-shaped case 45 of light emitting element 3 with little gap, is formed.

Cylindrical part 44 of holder 40 is formed such that inner perimeter surface 47 engages with total reflecting surface 12 of light flux controlling member 4 with gap 48. Then, on the opening edge side of cylindrical part 44, flange part accommodating recess part 50 that accommodates and supports annular flange part 10 of light flux controlling member 4, is formed (see FIG. 22(a)). This flange part accommodating recess part 50 has flange part supporting surface 51 that contacts the lower surface of flange part 10 of light flux controlling member 4, and flange part positioning surface 52 that contacts and engages with the outer perimeter surface of flange part 10 of light flux controlling member 4. Flange part supporting surface 51 is formed such that the height dimension from the inner surface of bottom part 43 (the dimension along center axis 42) is equal to or slightly greater than the dimension from the lower surface of flange part 10 of light flux controlling member 4 to back surface 15, along center axis 14, and supports flange part 10 such that back surface 15 of light flux controlling member 4 does not touch light emitting element 3.

Then, by fixing bottom part 43 of holder 40 on substrate 41 using an adhesive and so on and fixing flange part 10 of light flux controlling member 4 inside flange part accommodating recess part 50 of holder 40 using an adhesive and so on, light flux controlling member 4 is held by holder 40 in a state of being positioned with respect to light emitting element 3. By this means, light emitting element 3, holder 40 and light flux controlling member 4 are positioned and assembled on substrate 41 so that optical axis 8 of light emitting element 3, center axis 42 of holder 40, and center axis 14 of light flux controlling member 4 are aligned on the same axis.

Also, like light flux controlling member 4, holder 40 of the present embodiment is formed of a transparent resin material such as PMMA (polymethylmethacrylate), PC (polycarbonate) or EP (epoxy resin), transparent glass, and so on, and therefore holder 40 of the present embodiment function as a second light flux controlling member as well.

Figure 23:
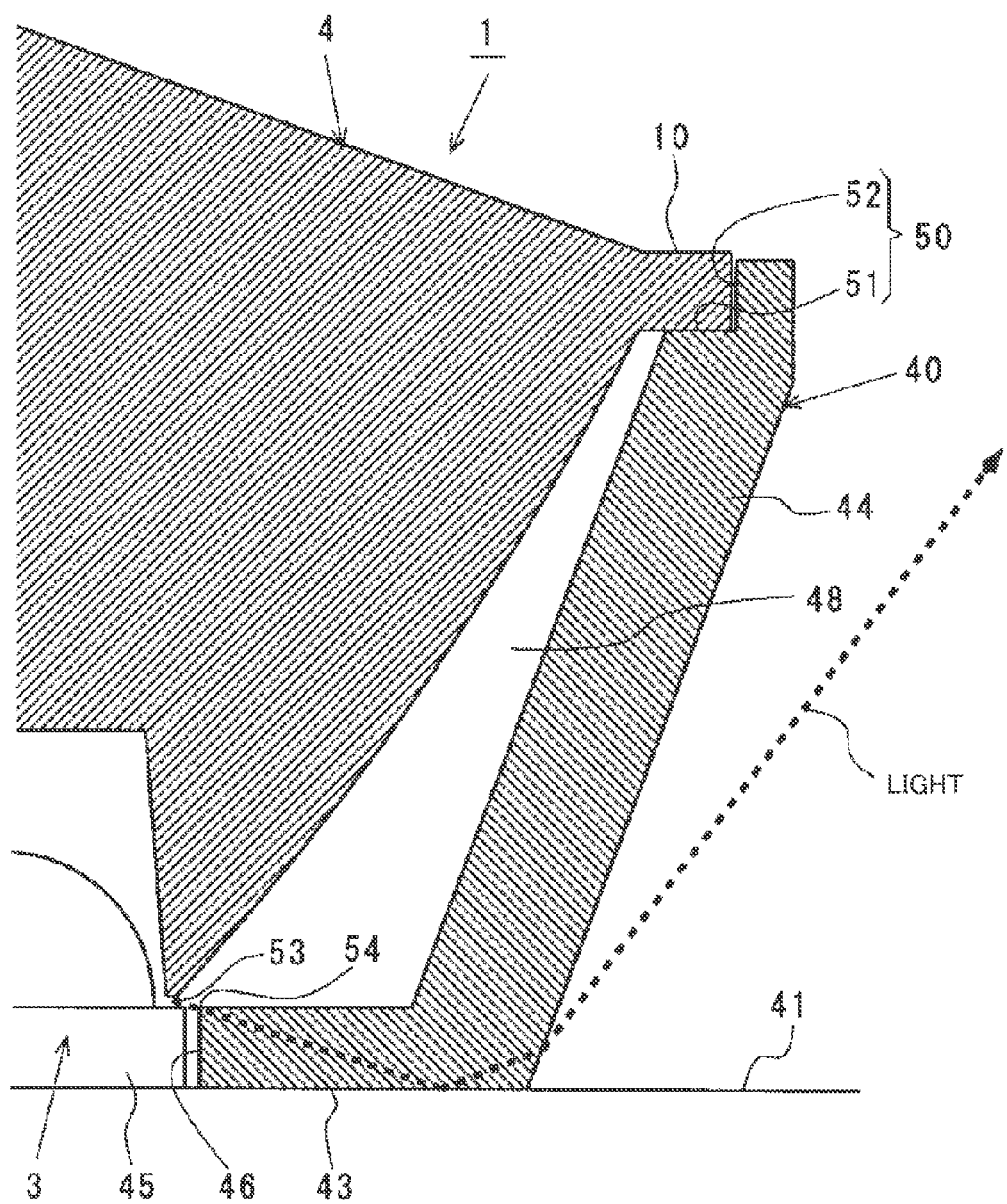
FIG. 23 is an enlarged cross sectional view showing part of the light flux controlling member of FIG. 3.

That is to say, as shown in FIG. 23, holder 40 of the present embodiment allows incidence of light that is emitted from light emitting element 3 and that leaks from gap 53 between the back surface 15 side of light flux controlling member 4 and light emitting element 3, from edge 54 of throughhole 46 in bottom part 43 or from the inner wall surface of throughhole 46, guides that incident light toward cylindrical part 44 in bottom part 43, so that the light arriving at cylindrical part 44 is refracted from the outer surface of cylindrical part 44 and output, and uses as illuminating light for an area near light emitting element 3 of illumination-target surface 6 (the lower edge 6a side of illumination-target surface 6) (see FIG. 2). Then, the shapes of bottom part 43 and cylindrical part 44 of holder 40 are formed to be able to output light that can illuminate illumination-target surface 6 nearby light emitting element 3 compared to the light output from light flux controlling member 4 to illuminate illumination-target surface 6 (see FIG. 2). Also, although the light that is output toward illumination-target surface 6 via holder 40 is light that cannot enter light flux controlling member 4 for having a large angle with respect to optical axis 8 of light emitting element 3 and is light of low luminous intensity compared to the light that enters light flux controlling member 4, the location on illumination-target surface 6 where the light arrives is near light emitting element 3 and the incidence angle on illumination-target surface 6 is small, so that the attenuation of light is reduced and this light can be used efficiently as illuminating light (see FIG. 2).

By using this holder 40 of the present embodiment as a second light flux controlling member, it is possible to illuminate illumination-target surface 6 that is far from light emitting element 3 by the light of high luminous intensity output from light flux controlling member 4 (that is, light near optical axis 8) and illuminate illumination-target surface 6 that is near light emitting element 3 by the light of low luminous intensity output from holder 40, so that efficient and quality lighting is made possible (see FIG. 2).

Also, although holder 40 of the present embodiment has been described to be formed separately from light flux controlling member 4, but it is equally possible to form part or the entirety of holder 40 as one with light flux controlling member 4. Also, it is equally possible to form the part for controlling light of low luminous intensity separately from holder 40 and light flux controlling member 4.

Also, holder 40 of the present embodiment does not necessarily have to output light leaking from gap 53 between back surface 15 of light flux controlling member 4 and light emitting element 3, and may output light of low luminous intensity (that is, light having luminous intensity far beyond the luminous intensity half power angle—for example, light of about 30% of the maximum luminous intensity), in the light output from light emitting element 3, toward illumination-target surface 6 (see FIG. 2).

Also, the shape of holder 40 is not limited to the shape of the above embodiment (see FIGS. 21 and 22), and any shape is possible as long as light can be refracted and output so that light of low luminous intensity can be output to an area on illumination-target surface 6 near light emitting element 3.

Also, bottom part 43 may be removed from holder 40 as long as light of low luminous intensity can be output to an area on illumination-target surface 6 near light emitting element 3 by means of cylindrical part 44 not including bottom part 43.

Example of Use of Light Flux Controlling Member

Figure 24B:
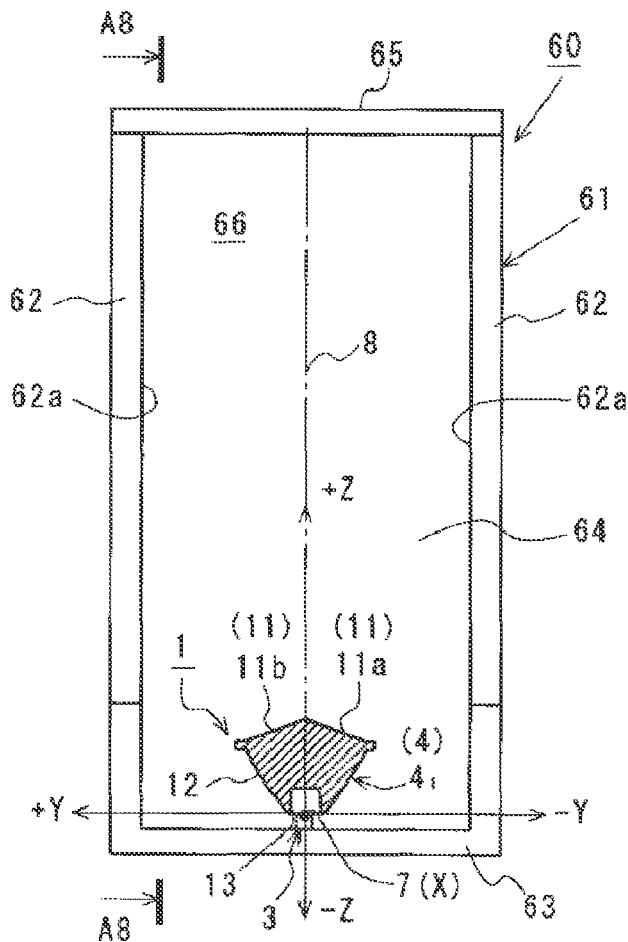
FIG. 24B is a side view in which the left side of case constituting internal-lighting lighting device according to the present invention is removed.
Figure 24A:
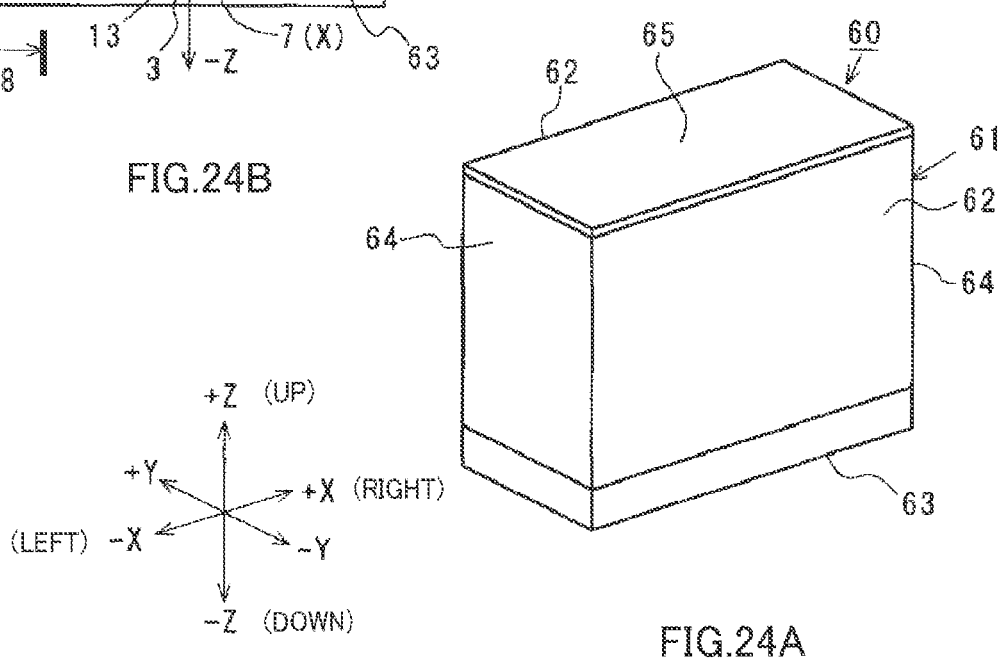
FIG. 24A is an outer perspective view looking at an internal-lighting light device of another example of use of a light flux controlling member according to the present invention, and shows the internal-lighting lighting device.
Figure 25A:
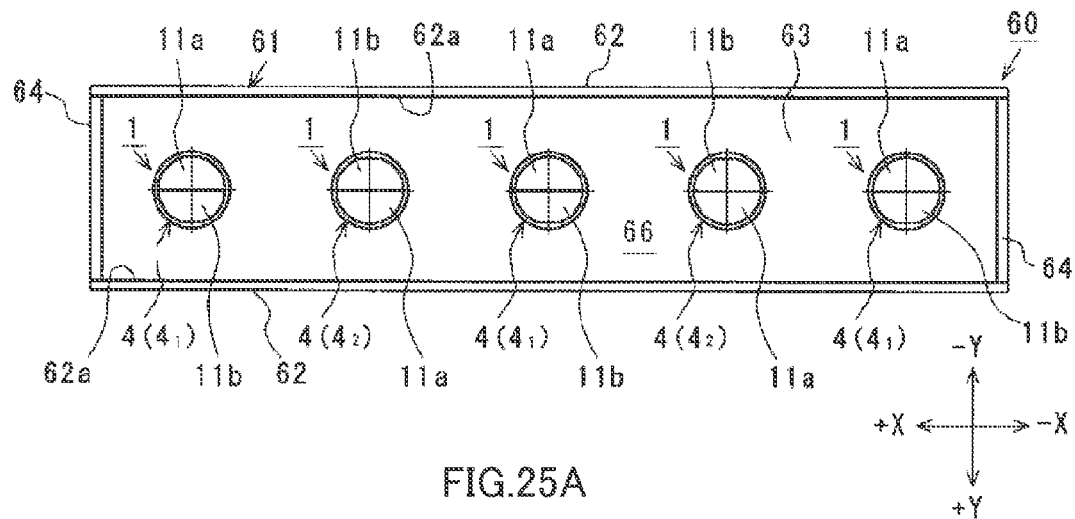
FIGS. 25A-25B shows an internal structure of an internal-lighting lighting device according to the present invention.
Figure 25B:
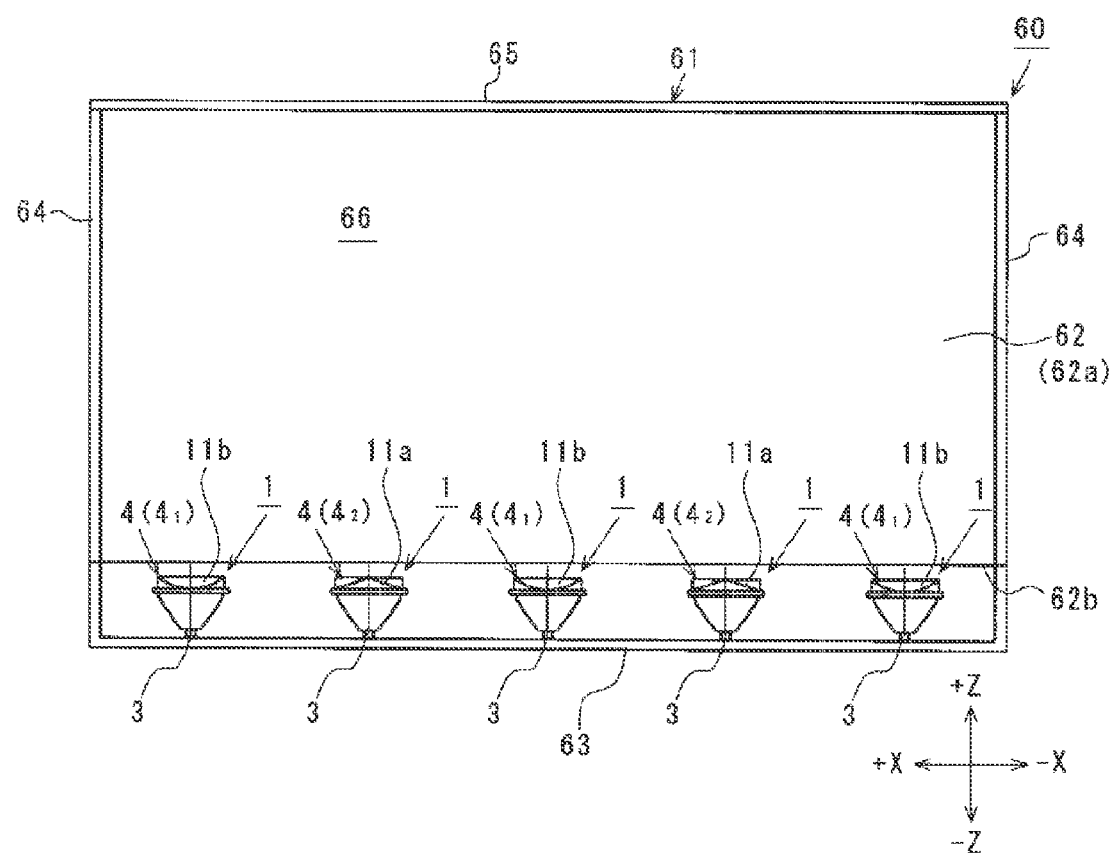

FIG. 24 and FIG. 25 show examples of using light flux controlling member 4 (light flux controlling member 4 according to the first embodiment) of the present invention for internal-lighting lighting device 60. Also, FIG. 24(a) is an outer perspective view looking at internal-lighting lighting device 60 according to the present invention from diagonally above. Also, FIG. 24(b) is a side view in which the left side of case 61 constituting internal-lighting lighting device 60 according to the present invention is removed. Also, FIG. 25(a) is a plan view showing an internal structure of internal-lighting lighting device 60 according to the present invention, and is a plan view of lighting device 60 in which the top plate to constitute case 61 is removed. Also, FIG. 25(b) is a front view of lighting device 60 cut along A8-A8 line in FIG. 24(b).

As shown in these drawings, with internal-lighting lighting device 60, a pair of translucent and flat-shaped lighting-target members 62 (advertisement panel, for example) are placed to oppose each other and in parallel, the lower ends of these lighting-target members 62 and 62 are supported by means of bottom plate 63, the left side gap and right side gap of these lighting-target members 62 and 62 are covered by side plates 64, and the upper ends of these lighting-target members 62 and 62 are covered by top plate 65 so as to form case 61 having space 66 inside. Then, by aligning a plurality of light emitting devices 1 on upper surface 63a of bottom plate 63 constituting case 61, this lighting device 60 accommodates the plurality of light emitting devices 1 inside case 61, and illuminates illumination-target surface (inner surface) 62a of lighting-target member 62, by means of these light emitting devices 1, from diagonally forward of the rear surface side (that is, the inner space side) of the pair of lighting-target members 62 and 62 and from the lower edge side of the pair of lighting-target members 62 and 62.

Light emitting device 1 is placed on bottom plate 63 such that optical axis 8 is parallel to illumination-target surfaces 62a and 62a of lighting-target members 62 and 62 and optical axis 8 extends along the Z axis direction.

On a plan view, light flux controlling member 4 to constitute light emitting device 1 is placed to be oriented 180° apart from another neighboring light flux controlling member 4 (that is, looking at the bottom plate 63 side from the top plate 65 side along the Z axis). That is to say, light flux controlling member 4 to primarily illuminate one illumination-target surface 62a in a pair of illumination-target surface 62a and 62a (belonging to the first group of light flux controlling member $4_1$) and light flux controlling member 4 to primarily illuminate the other one of illumination-target surface 62a (belonging to the second group of light flux controlling members $4_2$), are placed alternately, and first output surface 11a of each light flux controlling member $4_1$ or $4_2$ is placed on the side of illumination-target surface 62a of the primary illuminating target.

Figure 26A:
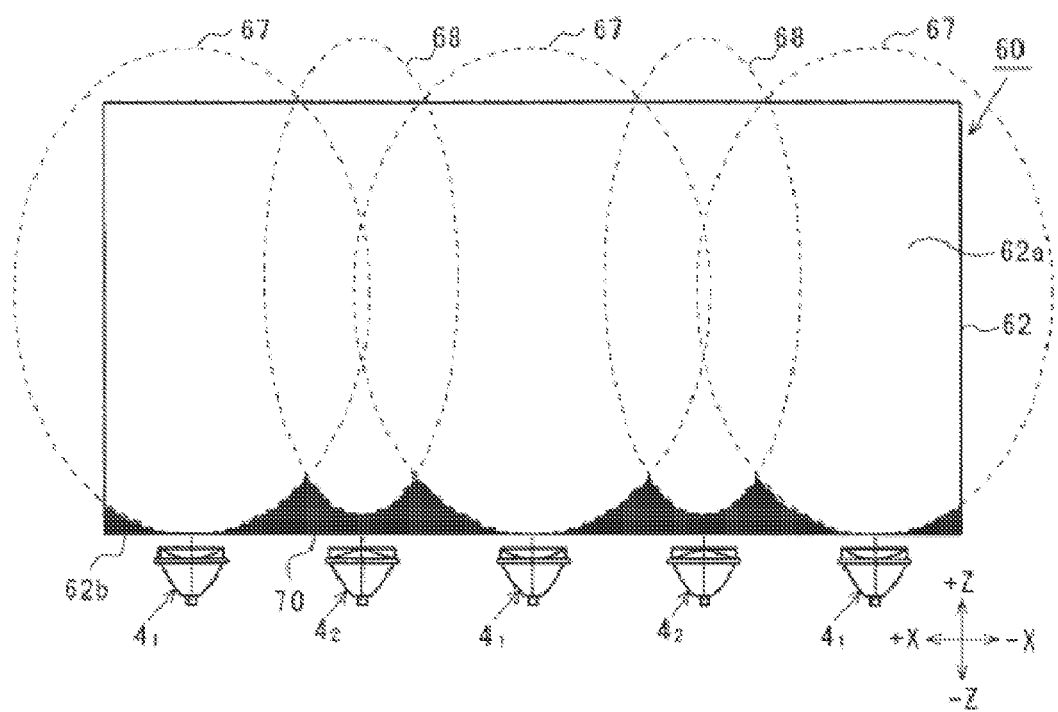
FIGS. 26A-26B shows the illumination condition on an illumination-target surface of an internal-lighting lighting device according to the present invention.

FIG. 26(a) shows the illuminating condition on one illumination-target surface 62a in a pair of illumination-target surface 62a and 62a in lighting device 60 of the present invention. Also, in illumination-target surface 62a of FIG. 26(a), parts that are sufficiently illuminated by the light from light flux controlling members $4_1$ and $4_2$ are shown as white blank areas.

As shown in this FIG. 26(a), one illumination-target surface 62a is illuminated over a wide range in ±X directions by means of first group light flux controlling member $4_1$ and is illuminated to lower edge 62b. Also, one illumination-target surface 62a is an area where the light from first group light flux controlling member $4_1$ has difficulty reaching, and an intermediate area in the X axis direction between first group light flux controlling members $4_1$ and $4_1$ is illuminated by the light from second group light flux controlling member $4_2$. As a result of this, with internal-lighting lighting device 60 according to the present invention, looking at one illumination-target surface 62a, illumination-target range 67 of the light from first group light flux controlling member $4_1$ is complemented by light illumination-target range 68 of the light from second group light flux controlling member $4_2$, and therefore this one illumination-target surface 62a is illuminated by first group and second group light group controlling members 4 ($4_1$ and $4_2$) such that the distribution of luminance is uniform over the entirety of this one illumination-target surface 62a, except for areas 70 (parts that are not white and blank) that are small and located on the lower edge 62b side.

The other illumination-target surface 62a is illuminated over a wide range in ±X directions by means of second group light flux controlling member $4_2$ and is illuminated to lower edge 62b. Also, the other illumination-target surface 62a is an area where the light from second group light flux controlling member $4_2$ has difficulty reaching, and an intermediate area in the X axis direction between second group light flux controlling members $4_2$ and $4_2$ is illuminated by the light from first group light flux controlling member $4_1$. As a result of this, with internal-lighting lighting device 60 according to the present invention, looking at the other illumination-target surface 62a, the illumination-target range of the light from second group light flux controlling member $4_2$ is complemented by the light illumination-target range of the light from first group light flux controlling member $4_1$, and therefore the other illumination-target surface 62a is illuminated by first group and second group light group controlling members 4 ($4_1$ and $4_2$) such that the distribution of luminance is uniform over the entirety of the other illumination-target surface 62a, except for the small areas located on the lower edge 62b side.

That is to say, with internal-lighting lighting device 60 according to the present invention, illumination-target surfaces 62a and 62a of a pair of lighting-target members 62 and 62 are illuminated by first group and second group light flux controlling members 4 ($4_1$ and $4_2$) such that the distribution of luminance is entirely uniform, except for small areas in lower edge 62b.

Figure 26B:
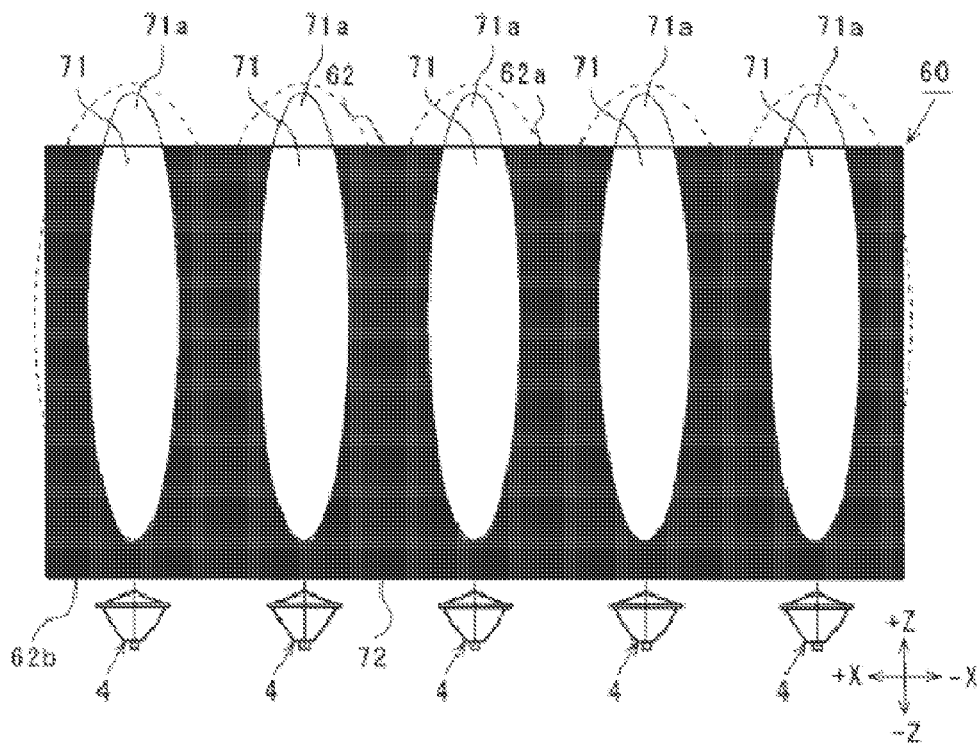

FIG. 26(b) shows the illuminating condition on one illumination-target surface 62a in lighting device 60 using light flux controlling member 4 of a comparative example (see FIG. 5 and FIG. 6) instead of light flux controlling member 4 of the present invention (light flux controlling member 4 of the first embodiment). In illumination-target surface 62a of FIG. 26(b), the illumination-target range by the light from light flux controlling member 4 is shown by broken lines and the part that is particularly bright in illumination-target surface 62a is shown by solid lines (bright part 71) is shown as a white and blank part.

As shown in FIG. 26(b), in one illumination-target surface 62a, an intermediate part between neighboring light flux controlling members 4 and 4 is recognized as a dark part. This is because the light from light flux controlling member 4 is concentrated and illuminated in a narrow range, so that, compared to illumination-target surface 62a of FIG. 26(a), bright part 71 is visually identified as being particularly bright in the illumination-target range shown by broken lines. Also, with lighting device 60 using light flux controlling member 4 of a comparative example, one illumination-target surface 62a has the same luminance distribution as the other illumination-target surface 62a.

By this means, compared to lighting device 60 using light flux controlling member 4 according to the comparative example, lighting device 60 using light flux controlling member 4 ($4_1$ and $4_2$) of the present invention cane significantly improve the quality of lighting.

Figure 27C:
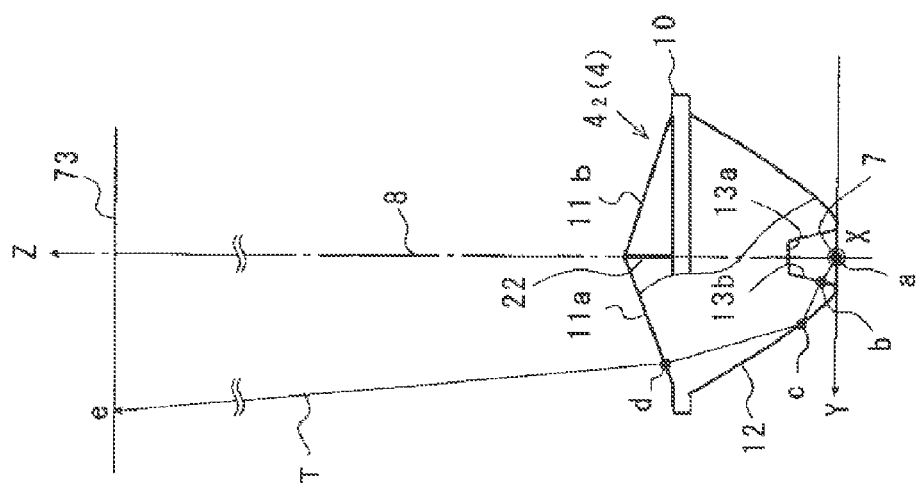
FIGS. 27A-27C shows a light flux controlling member according to a comparative example.
Figure 27B:
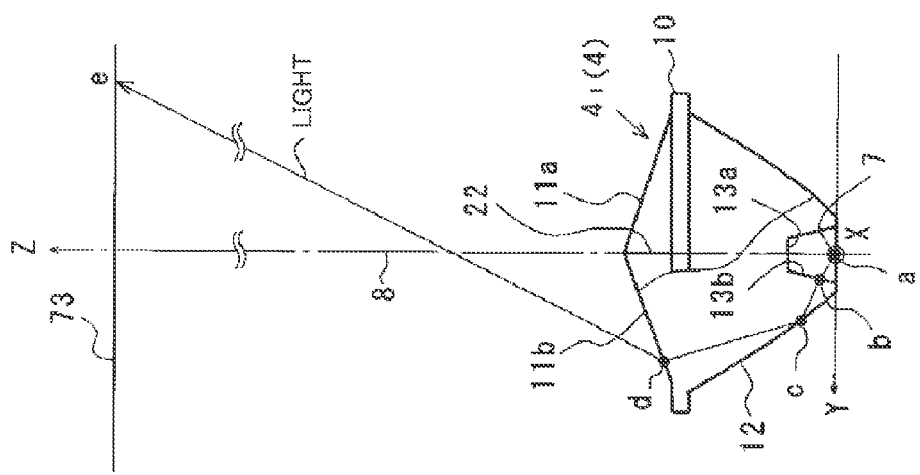
Figure 27A:
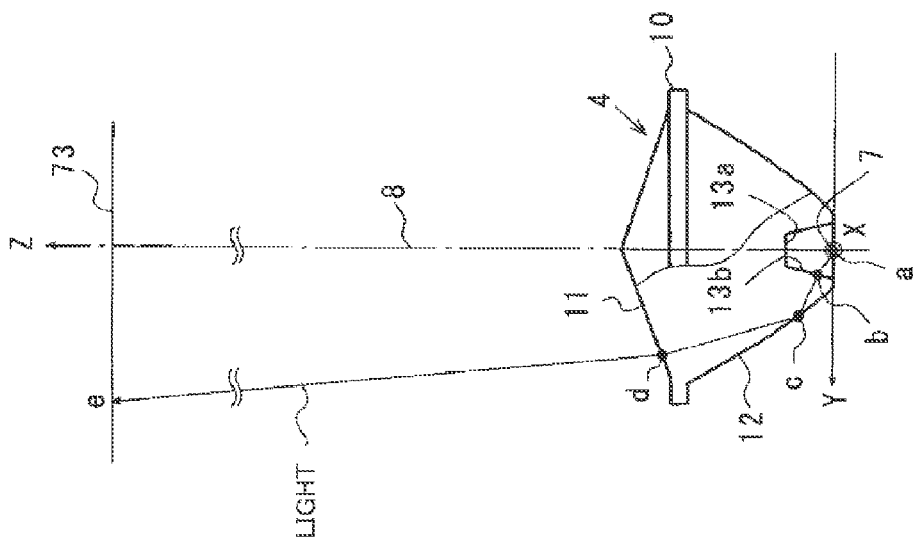

FIG. 27 explains differences in output characteristics between first group of light flux controlling member $4_1$ (4) of the present invention, second group of light flux controlling member $4_2$ (4) of the present invention, and light flux controlling member 4 according to the comparative example, and explain differences in output characteristic between light flux controlling members $4_1$, $4_2$ and 4 found out in a simulation experiment. Also, FIG. 27(a) provides a schematic view of a simulation experiment result with respect to light flux controlling member 4 according to a comparative example. Also, FIG. 27(b) schematically shows a simulation experiment result with respect to first group light flux controlling member $4_1$ according to the present invention. Also, FIG. 27(c) schematically shows a simulation experiment result with respect to second group light flux controlling member $4_2$ according to the present invention. Also, the X axis, Y axis and Z axis in FIG. 27 correspond to the X axis, Y axis and Z axis in FIG. 24. Also, referring to FIG. 27, measurement surface 23 where the output light from light flux controlling members $4_1$, $4_2$ and 4 arrives, is a virtual plane that is parallel to the X-Y plane and that is located 200 mm apart from the X-Y plane along the Z axis direction.

In FIG. 27, light emission center 7 on the light emitting surface of the light emitting element is the intersection of the X axis, Y axis and Z axis. Then, in a simulation experiment, focus is placed on the light output from point a, which is light emission center 7, to find out how this light travels inside light flux controlling member 4 and arrives at which location on measurement surface 73. Then, table 3 to table 5 show simulation experiment results in numeric values. Table 3 shows a simulation experiment result with respect to light flux controlling member 4 according to a comparative example. Table 4 shows a simulation experiment result with respect to first group light flux controlling member $4_1$ according to the present invention. Also, table 5 shows a simulation experiment result with respect to second group light flux controlling member $4_2$ according to the present invention. The values in these tables 3 to 5 are in millimeters (mm).

TABLE 3

|   | X | Y | Z |
|---|---|---|---|
| a | 0.000 | 0.000 | 0.000 |
| b | −1.356 | 0.086 | 0.486 |
| c | −2.041 | 0.129 | 0.667 |
| d | −2.808 | 0.178 | 7.230 |
| e | −2.801 | 0.177 | 200.000 |

(unit of measurement: mm)

TABLE 4

|   | X | Y | Z |
|---|---|---|---|
| a | 0.000 | 0.000 | 0.000 |
| b | −1.356 | 0.086 | 0.486 |
| c | −2.041 | 0.129 | 0.667 |
| d | −2.905 | 0.184 | 8.165 |
| e | −36.864 | −37.954 | 200.000 |

(unit of measurement: mm)

TABLE 5

|   | X | Y | Z |
|---|---|---|---|
| a | 0.000 | 0.000 | 0.000 |
| b | −1.356 | 0.086 | 0.486 |
| c | −2.041 | 0.129 | 0.667 |
| d | −2.798 | 0.177 | 7.233 |
| e | −2.335 | 0.148 | 200.000 |

(unit of measurement: mm)

Point b in FIGS. 27(a) to (c) is the location where the light output from point a is incident on second input surface 13b of light flux controlling member 4. Also, point c in FIGS. 27(a) to (c) is the location where the light having entered light flux controlling member 4 from point b is total-reflected on total reflecting surface 12. Also, point d in FIG. 27(a) is the location where the light reflected on total reflecting surface 12 arrives at output surface 11 (the location of emission from output surface 11), point d in FIG. 27(b) is the location where the light reflected on total reflecting surface 12 arrives at output surface 11b (the location of emission from output surface 11b), and point d in FIG. 27(c) is the location where the light reflected on total reflecting surface 12 arrives at output surface 11a (the location of emission from output surface 11a). Also, point e in FIG. 27 is the location where the light output from output surface 11 (11a and 11b) of light flux controlling member 4 arrives at measurement surface 73.

As obvious from the above simulation experiment results, the shape of input surface 13 and the shape of total reflecting surface 12 are the same between light flux controlling member 4 according to the comparative example, first light flux controlling member $4_1$ of the present embodiment, and second light flux controlling member $4_2$ of the present embodiment, so that the locations of point a to point c are also the same. However, the shape of output surface 11 of light flux controlling member 4 according to the comparative example, the shape of second output surface 11b of a light flux controlling member (first group light flux controlling member $4_1$) according to the present invention, and the shape of first output surface 11a of a light flux controlling member (second group light flux controlling member $4_2$) according to the present invention are different, so that point d and point e are different between light flux controlling member 4 of the comparative example, first group light flux controlling member $4_1$ according to the present invention and second group light flux controlling member $4_2$ according to the present invention. In particular, point e in first group light flux controlling member $4_1$ of the present invention is significantly different from point e in second group light flux controlling member $4_2$ of the present embodiment. Since the shape of first output surface 11a of light flux controlling member 4 according to the present invention is similar to the shape of output surface 11 of light flux controlling member 4 according to a comparative example, point d and point e in second group light flux controlling member $4_2$ according to the present invention differ very little from point d and point e in light flux controlling member 4 of the comparative example.

That is to say, the light output from second output surface 11b of light flux controlling member $4_1$ according to the present embodiment arrives at a location (point e) on measurement surface 73 that is a (13 to 15 times) greater distance apart from the Z axis in the −X direction, compared to the light output from first output surface 11 of light flux controlling member 4 according to the comparative example or from output surface 11a of light flux controlling member $4_2$ of the present invention, and arrives at a location (point e) on measurement surface 73 that is a great distance (about the dimension in the −X direction) apart from the Z axis in the −Y direction. The −Y direction in FIG. 27 is closer to one illumination-target surface 62a (the right one in FIG. 24(b)) beyond optical axis 8 in FIG. 24. Consequently, with second output surface 11b of first group light flux controlling member $4_1$ of the present embodiment, output surface 11 of light flux controlling member 4 according to a comparative example, and first output surface 11a of second group light flux controlling member $4_2$ of the present embodiment, it is possible to control the light that arrives at top plate 65 (bright part 71a in FIG. 26(a)) and part of the light to produce bright part 71 to travel toward one illumination-target surface 62a, improve the uniformity of brightness in the illumination-target range of first group light flux controlling member $4_1$ on one illumination-target surface 62a, and furthermore output light on illumination-target surface 62a over a wide range in the width direction (±X direction).

As described above, by using light flux controlling member 4 according to the present embodiment, light emitting device 1 and lighting device 2 do not require reflecting members as used in prior art, and, by removing such reflecting members that are no longer necessary, it is possible to miniaturize and simplify the structure, reduce the number of components and elements, and lower the product cost. Also, lighting device 60 according to the present embodiment realizes bright and quality lighting using a reflecting member, at the same product cost as by prior art.

Also, internal-lighting lighting device 60 according to the present invention may hold light flux controlling member 4 according to the present invention by means of holder 40 shown in FIG. 21 and FIG. 22. By this means, by utilizing the functions of holder 40 as a light flux controlling member as shown in FIG. 21 and FIG. 22, it is possible to illuminate the lower edge 62b side (edge part closer to light emitting element 3) of illumination-target surface 62a by the light output from holder 40. By this means, in combination with the output light from erect walls 22 of light flux controlling member 4 according to the present invention, it is possible to illuminate the lower edge 62b side (edge part closer to light emitting element 3) of illumination-target surface 62 efficiently, so that it is possible to reduce the area of low luminous intensity on the lower edge 62b side of illumination-target surface 62a. As a result of this, for example, when lighting-target member 62 of lighting device 60 according to the present invention is a signboard, it is possible to narrow the area of low luminous intensity (frame area) that cannot be used efficiently for advertisement, and increase the area that can be utilized efficiently.

Although internal-lighting lighting device 60 has been described to provide first group light flux controlling member $4_1$ and second group light flux controlling member $4_2$ alternately in order to illuminate illumination-target surfaces 62a and 62a of a pair of illumination-target members 62 and 62 evenly, the present invention is not limited to this, and it is equally possible to align a plurality of first group light flux controlling members $4_1$ in order to illuminate illumination-target surface 62a of one lighting-target member 62 alone, or it is also possible to align a plurality of second group light flux controlling members $4_2$ in order to illuminate illumination-target surface 62a of the other lighting-target member 62 alone.

Also, although internal-lighting lighting device 60 of the present invention has been described above to provide a pair of lighting-target members 62 and 62 in parallel with respect to optical axis 8 of light emitting device 1, the present invention is not limited to this, and it is equally possible to place the upper end of illumination-target surface 62a (edge part in the +Z direction) closer to the Z axis or farther from the Z axis, and make illumination-target surface 62a to be inclined with respect to optical axis 8 within the range light emitting device 1 can illuminate lighting-target member 62 and under certain conditions. Now, provided that, in the output light from light flux controlling member 4, the light to illuminate a location on illumination-target surfaces 62a and 62a near light emitting device 1 is "light far from optical axis," and, in the output light from light flux controlling member 4, the light to form a smaller angle with optical axis 8 than "light far from optical axis" will be referred to as "light near optical axis," the above "certain conditions" might include using light emitting device 1 such that "light near optical axis" forms a greater angle of incidence on illumination-target surfaces 62a and 62a than "light far from optical axis."

Although internal-lighting lighting device 60 of the present invention has been described above to use light flux controlling member 4 according to the first embodiment, light flux controlling members 4 according to other embodiments and variations of such light flux controlling members 4 are equally applicable.

INDUSTRIAL APPLICABILITY

The light emitting device using a light flux controlling member according to the present invention is applicable to, for example, an internal-lighting or external-lighting lighting device for a signboard, a lighting device for illuminating a ceiling surface, floor surface, and wall surface, and a lighting device for indirect lighting and for lighting trees and plants.

REFERENCE SIGNS LIST

1 Light emitting device
2, 60 Lighting device
3 Light emitting element (LED, for example)
4 Light flux controlling member
6, 62 Illumination-target surface
7 Light emission center
8 Optical axis
11 Output surface
11a First output surface
11b Second output surface
12 Total reflecting surface
12a First total reflecting surface
12b Second total reflecting surface
13 Input surface
13a First input surface
13b Second input surface
14 Center axis
15 Back surface
16 Recess
20 Upper edge (vertex side)

The invention claimed is:

1. A light flux controlling member that emits light from a light emitting element, from a location diagonally in front of an illumination target surface, diagonally with respect to the illumination target surface, a center axis of the light flux controlling member being provided to match an optical axis of the light emitting element, the light flux controlling member comprising:
   an input surface that receives as input the light from the light emitting element;
   a total reflecting surface that total-reflects to collect part of the light received as input on the input surface; and
   an output surface that outputs the light total-reflected on the total reflecting surface and light arriving directly from the input surface, wherein:
   the input surface is an inner surface of a recess formed on a back surface side to face the light emitting element, and has a first input surface that is located in a bottom part of the recess and a second input surface that is located between the first input surface and an opening edge of the recess;
   the total reflecting surface is formed between the back surface side and the output surface side and is formed to surround the optical axis, and total-reflects light received as input mainly from the second input surface in the input surfaces, toward the output surface side;
   the output surface has a first output surface that is formed in a location on an opposite side of the back surface, around the optical axis, and that is provided closer to the illumination-target surface beyond the optical axis, and a second output surface that is provided in a location farther away from the illumination target surface than the first output surface;
   the second output surface is formed such that, compared to light distribution characteristics of output light from a surface rotating the first output surface through 180 degrees around the optical axis of the light emitting element as a rotation axis, with output light from the second output surface, a greater number of light fluxes travel toward the illumination target surface;
   the first output surface has an intersection line between a cross section that is perpendicular to the illumination target surface and that includes the center axis, and the first output surface, as a generatrix, and is a curved surface formed by rotating this generatrix in a ±90° angular range around the center axis as the rotation axis;
   looking at the output surface on a plan view, the second output surface is an inclined surface which is separated from the first output surface along a center line that is perpendicular to the center axis, and in which a vertex side at the same height level as a vertex of the first output surface along the center line is formed, and the height decreases gradually farther from the vertex side; and
   the first output surface and the second output surface are connected via a pair of erect walls that are line-symmetrical around the center axis.

2. The light flux controlling member according to claim 1, wherein surfaces of the erect walls are made rough.

3. The light flux controlling member according to claim 1, wherein:
   the total reflecting surface has a first total reflecting surface that is provided closer to the illumination target surface beyond the optical axis, and a second total reflecting surface that is provided in a location farther distant from the illumination target surface than the first total reflecting surface; and
   the second total reflecting surface is formed such that reflecting light approaches the optical axis closer than reflecting light on the first total reflecting surface.

4. The light flux controlling member according to claim 1, placed such that, as a distance from a light emission center of the light emitting element develops greater, an optical axis to extend from the light emission center approaches the illumination target surface closer.

5. A light emitting device comprising a light emitting element and a light flux controlling member according to claim 1.

6. A lighting device comprising a light emitting device according to claim 5 and an illumination target surface to be illuminated by output light from the light emitting device, wherein the light emitting device is placed such that, given that, in the output light, light to illuminate a location on the illumination target surface near the light emitting device is light far from the optical axis, and, in the output light, light to form a smaller angle with the optical axis than the light far from the optical axis, the light near the optical axis forms a greater incidence angle on the illumination target surface than the light far from the optical axis.

7. The lighting device according to claim 6, wherein the pair of erect walls are placed so as to be directed to the illumination target surface.

8. The light flux controlling member according to claim 1, wherein the pair of erect walls are placed so as to be directed to the illumination target surface.

* * * * *